(12) United States Patent
Liang et al.

(10) Patent No.: US 12,177,828 B2
(45) Date of Patent: Dec. 24, 2024

(54) METHOD FOR RESOURCE ALLOCATION, METHOD FOR RESOURCE RELEASE, TERMINAL, AND NETWORK DEVICE

(71) Applicant: VIVO MOBILE COMMUNICATION CO., LTD., Guangdong (CN)

(72) Inventors: Jing Liang, Dongguan (CN); Qian Zheng, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 601 days.

(21) Appl. No.: 17/482,891

(22) Filed: Sep. 23, 2021

(65) Prior Publication Data
US 2022/0015110 A1    Jan. 13, 2022

Related U.S. Application Data

(63) Continuation of application No. PCT/CN2020/081016, filed on Mar. 25, 2020.

(30) Foreign Application Priority Data

Mar. 25, 2019 (CN) .......................... 201910228885.3

(51) Int. Cl.
*H04W 72/121* (2023.01)
*H04W 76/27* (2018.01)

(52) U.S. Cl.
CPC .......... *H04W 72/121* (2013.01); *H04W 76/27* (2018.02)

(58) Field of Classification Search
CPC ........................... H04W 72/121; H04W 76/27
See application file for complete search history.

(56) References Cited

U.S. PATENT DOCUMENTS

| 11,910,377 | B2 * | 2/2024 | Yang | H04W 72/0453 |
| 2018/0124803 | A1 * | 5/2018 | Deng | H04W 72/12 |
| 2018/0234977 | A1 | 8/2018 | Yasukawa et al. | |
| 2019/0052436 | A1 * | 2/2019 | Desai | H04W 72/0446 |
| 2019/0109686 | A1 * | 4/2019 | Jiang | H04L 5/0053 |
| 2019/0223231 | A1 | 7/2019 | Muraoka et al. | |

(Continued)

FOREIGN PATENT DOCUMENTS

| CN | 107852728 | A |   | 3/2018 | | |
| CN | 110944355 | A | * | 3/2020 | ......... | H04W 24/10 |
| CN | 111436139 | B | * | 7/2023 | ........ | H04W 72/0486 |

(Continued)

OTHER PUBLICATIONS

"Discussion on NR V2X mode 2 alternatives" 3GPP TSG-RAN WG2#104, ZTE, Sanechips, R2-1816990, Nov. 12, 2018.

(Continued)

*Primary Examiner* — Chae S Lee
(74) *Attorney, Agent, or Firm* — BROOKS KUSHMAN P.C.

(57) ABSTRACT

A method for resource allocation, a method for resource release, a terminal, and a network device are provided. The method for resource allocation includes: transmitting first request information to a network device, where the first request information is used to request allocation of a resource; receiving, from the network device, information related to the resource; and transmitting the information related to the resource to a group member terminal.

20 Claims, 9 Drawing Sheets

(56) References Cited

U.S. PATENT DOCUMENTS

2019/0254104 A1* 8/2019 Gurumoorthy ....... H04W 76/27

FOREIGN PATENT DOCUMENTS

| WO | 2018047401 A1 | 3/2018 |
|----|---------------|--------|
| WO | 2018137566 A1 | 8/2018 |
| WO | 2018202798 A1 | 11/2018 |

OTHER PUBLICATIONS

"Discussion on working scope of V2X" 3GPP TSG RAN Meeting #83, ZTE, Sanechips, RP-190216, Mar. 18, 2019.
Written Opinion and International Search Report in Application No. PCT/CN2020/081016 dated Oct. 7, 2021.
CN Office Action in Application No. 201910228885.3 Dated Jun. 17, 2022.
EP Search Report in Application No. 20777858.0 Dated May 9, 2022.
IN Office Action in Application No. 202127048374 Dated Mar. 25, 2022.
"Mode 2a and Mode 2d for NR V2X Resource Allocation." 3GPP RAN WG1 Meeting AH 1901, InterDigital Inc., R1-1900769, Jan. 21, 2019.
"Discussion on Basic Resource Allocation Methods for NR-VEX Sidelink Communication" 3GPP TSG RAN WGI #96, Fujitsu, R1-1901946, Feb. 25, 2019.
"Considerations on groupcast" 3GPP TSG WG2 Meeting #105, ZTE Sanechips, R2-1900384, Feb. 25, 2019.

* cited by examiner

METHOD FOR RESOURCE ALLOCATION, METHOD FOR RESOURCE RELEASE, TERMINAL, AND NETWORK DEVICE

CROSS-REFERENCE TO RELATED APPLICATIONS

This application is continuation application of PCT International Application No. PCT/CN2020/081016 filed on Mar. 25, 2020, which claims priority to Chinese Patent Application No. 201910228885.3, filed in China on Mar. 25, 2019, which are incorporated in their entireties by reference herein.

TECHNICAL FIELD

This disclosure relates to the field of communications technologies, and in particular, to a method for resource allocation, a method for resource release, a terminal, and a network device.

BACKGROUND

Currently, two resource allocation modes, mode 1 and mode 2, are defined in a new radio (NR) vehicle to everything (V2X) system. In mode 1, a network device such as a base station schedules resources. In mode 2, a terminal such as user equipment (UE) determines which resource is to be used for transmission; in this case, resource information may come from a broadcast message of the base station or may be preconfigured. If the UE works within a coverage of the base station and has a radio resource control (RRC) connection to the base station, the UE may work in resource allocation mode 1 and/or mode 2. If the UE works within the coverage of the base station and has no radio resource control connection to the base station, the UE can merely work in resource allocation mode 2. If the UE is located beyond the coverage of the base station, the UE can merely work in resource allocation mode 2, and perform V2X transmission based on preconfigured information.

The resource allocation mode 2 may be classified into mode 2a, mode 2b, mode 2c, and mode 2d. In mode 2d, the UE schedules sidelink transmission of other UEs (UE schedules sidelink transmissions of other UEs).

However, in a scenario of the current resource allocation mode 2d, it is still unclear how to allocate resources for group member UEs.

SUMMARY

This disclosure provides a method for resource allocation, a method for resource release, a terminal, and a network device, so as to resolve the problem that in a current resource allocation mode 2d scenario, it is still unclear how to allocate resources for group member terminals.

In order to resolve the foregoing technical problem, the embodiments of this disclosure are implemented as follows:

According to a first aspect, an embodiment of this disclosure provides a method for resource allocation, applied to a target terminal and including:
transmitting first request information to a network device, where the first request information is used to request allocation of a resource;
receiving, from the network device, information related to the resource; and
transmitting the information related to the resource to a group member terminal.

According to a second aspect, an embodiment of this disclosure provides a method for resource allocation, applied to a network device and including:
receiving first request information from a target terminal, where the first request information is used to request allocation of a resource; and
transmitting information related to the resource to the target terminal.

According to a third aspect, an embodiment of this disclosure provides a method for resource release, applied to a terminal and including:
obtaining resource configuration information from a network device; and
transmitting a fourth release message to the network device; where
the fourth release message is used to indicate resource configuration information released by the terminal.

According to a fourth aspect, an embodiment of this disclosure provides a method for resource release, applied to a network device and including:
transmitting resource configuration information to a terminal; and
receiving a fourth release message from the terminal; where
the fourth release message is used to indicate resource configuration information released by the terminal.

According to a fifth aspect, an embodiment of this disclosure provides a terminal, where the terminal is a target terminal, including:
a first transmitting module, configured to transmit first request information to a network device; where the first request information is used to request allocation of a resource;
a first receiving module, configured to receive, from the network device, information related to the resource; and
a second transmitting module, configured to transmit the information related to the resource to a group member terminal.

According to a sixth aspect, an embodiment of this disclosure provides a network device, including:
a second receiving module, configured to receive first request information from a target terminal, where the first request information is used to request allocation of a resource; and
a third transmitting module, configured to transmit the information related to the resource to the target terminal.

According to a seventh aspect, an embodiment of this disclosure provides a terminal, including:
an obtaining module, configured to obtain resource configuration information from a network device; and
a fourth transmitting module, configured to transmit a fourth release message to the network device; where
the fourth release message is used to indicate resource configuration information released by the terminal.

According to an eighth aspect, an embodiment of this disclosure provides a network device, including:
a fifth transmitting module, configured to transmit resource configuration information to a terminal; and
a third receiving module, configured to receive a fourth release message from the terminal; where
the fourth release message is used to indicate resource configuration information released by the terminal.

According to a ninth aspect, an embodiment of this disclosure provides a terminal, including a memory, a processor, and a program stored in the memory and capable of running on the processor. When the program is executed by the processor, the steps of the method for resource allocation applied to the target terminal can be implemented, or the steps of the method for resource release applied to the terminal can be implemented.

According to a tenth aspect, an embodiment of this disclosure provides a network device, including a memory, a processor, and a program stored in the memory and capable of running on the processor. When the program is executed by the processor, the steps of the method for resource allocation applied to the network device can be implemented, or the steps of the method for resource release applied to the network device can be implemented.

According to an eleventh aspect, an embodiment of this disclosure provides a computer-readable storage medium, and a program is stored in the computer-readable storage medium. When the program is executed by a processor, the steps of the method for resource allocation are implemented, or the steps of the method for resource release are implemented.

In the embodiments of this disclosure, the first request information is transmitted to the network device, where the first request information is used to request allocation of a resource. The information related to the resource is received from the network device, and the information related to the resource is transmitted to the group member terminal. In this way, in scenarios of the current resource allocation mode 2d or other resource allocation modes, resource allocation is implemented for the group member terminal, thereby ensuring smoothness of the corresponding communication procedure.

BRIEF DESCRIPTION OF DRAWINGS

To describe the technical solutions in the embodiments of this disclosure more clearly, the following briefly introduces the accompanying drawings required for describing the embodiments of this disclosure. Apparently, the accompanying drawings in the following description show merely some embodiments of this disclosure, and a person of ordinary skill in the art may still derive other drawings from these accompanying drawings without creative efforts.

DESCRIPTION OF EMBODIMENTS

Figure 1:
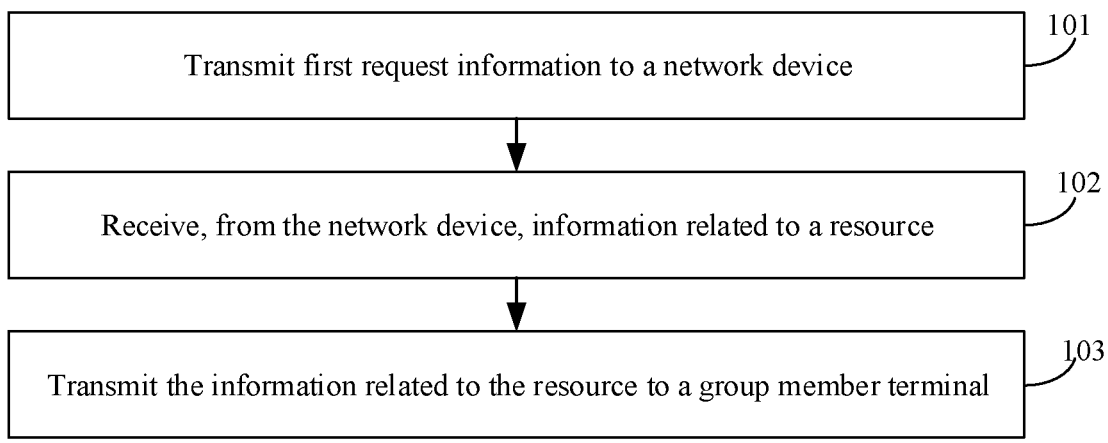
FIG. 1 is a flowchart of a method for resource allocation according to an embodiment of this disclosure.

To describe the technical solutions in the embodiments of this disclosure more clearly, the following briefly introduces the accompanying drawings required for describing the embodiments of this disclosure. Apparently, the accompanying drawings in the following description show merely some embodiments of this disclosure, and a person of ordinary skill in the art may still derive other drawings from these accompanying drawings without creative efforts.

In the specification and claims of this disclosure, the terms such as "first" and "second" are intended to distinguish between similar objects but do not necessarily indicate a specific order or sequence. It should be understood that the numbers used in this way is interchangeable in appropriate circumstances so that the embodiments of this disclosure described herein can be implemented in other orders than the order illustrated or described herein. Moreover, the terms "include", "have" and any other variants mean to cover the non-exclusive inclusion, for example, a process, method, system, product, or device that includes a list of steps or units is not necessarily limited to those units, but may include other units not expressly listed or inherent to such a process, method, product, or device. Use of "and/or" in the specification and claims represents at least one of connected objects.

Technologies described herein are not limited to a Long Term Evolution (LTE)/LTE-Advanced (LTE-A) system, and can also be used in various wireless communications systems, such as Code Division Multiple Access (CDMA), Time Division Multiple Access (TDMA), Frequency Division Multiple Access (FDMA), Orthogonal Frequency Division Multiple Access (OFDMA), Single-carrier Frequency-Division Multiple Access (SC-FDMA), and other systems. The terms "system" and "network" are usually used interchangeably. The CDMA system can implement radio technologies such as CDMA2000 and Universal Terrestrial Radio Access (UTRA). The UTRA includes wideband CDMA (Wideband Code Division Multiple Access, WCDMA) and other CDMA variants. The TDMA system can implement radio technologies such as the global system for mobile communications (GSM). The OFDMA system can implement radio technologies such as ultra mobile broadband (UMB), evolved UTRA (Evolution-UTRA, E-UTRA), IEEE 802.11 (Wi-Fi), IEEE 802.16 (WiMAX), IEEE 802.20, and Flash-OFDM. The UTRA and E-UTRA are parts of the universal mobile telecommunications system (UMTS). The LTE and more advanced LTE (such as LTE-A) are new UMTS releases that use the E-UTRA. The UTRA, E-UTRA, UMTS, LTE, LTE-A, and GSM are cited from descriptions of the documentation of the organization named "3rd Generation Partnership Project" (3GPP). The CDMA2000 and UMB are cited from descriptions of the documentation of the organization named "3rd Generation Partnership Project 2" (3GPP2). Techniques described in this specification may be used in the aforementioned systems and radio technologies, and can also be used in other systems and radio technologies.

However, in the following descriptions, a new radio (NR) system is described for an illustration purpose, and NR terms are used in most of the following descriptions. Those skilled in the art can understand that the embodiments are merely examples, and do not constitute any limitation, and the technical solutions in the embodiments of this disclosure may also be applied to other applications than an NR system application.

A wireless communication system in the embodiments of this disclosure includes a terminal and a network device. The terminal may also be referred to as a terminal device or user equipment (UE). The terminal may be a terminal-side device such as a mobile phone, a tablet computer, a laptop computer, a personal digital assistant (PDA), a mobile Internet device (MID), a wearable device, or an in-vehicle device. It should be noted that a specific type of the terminal is not limited in the embodiments of this disclosure. The network device may be a base station or a core network. The base station may be a 5G base station and a base station of a later version (for example, a gNB or a 5G NR NB), or a base station in another communications system (for example, an eNB, a WLAN access point, or another access point). The base station may be referred to as a NodeB, an evolved NodeB, an access point, a base transceiver station (BTS), a radio base station, a radio transceiver, a basic service set (BSS), an extended service set (ESS), a NodeB, an evolved NodeB (eNB), a home NodeB, a home evolved NodeB, a WLAN access point, a Wi-Fi node, or another appropriate term in the art. As long as a same technical effect is achieved, the base station is not limited to a specific technical term.

This disclosure is described in detail below with reference to the embodiments and the accompanying drawings.

Referring to FIG. 1, FIG. 1 is a flowchart of a method for resource allocation according to an embodiment of this disclosure. The method is applied to a target terminal, and as shown in FIG. 1, the method includes the following steps.

Step 101: Transmit first request information to a network device.

The first request information is used to request allocation of a resource. Optionally, the first request information may be used to request allocation of a resource to a target terminal or a group member terminal.

In specific implementation, the first request information may be transmitted by using an RRC message. When the target terminal is in an RRC connected state, the RRC message may be directly transmitted through an RRC connection. When the target terminal is in an RRC idle or RRC inactive state, the RRC message may be transmitted by using an RRC connection establishment procedure or an RRC connection recovery procedure; or the RRC message may be transmitted after the RRC connection establishment procedure or the RRC connection recovery procedure is completed.

Optionally, the target terminal may be any one of the following:

- a group administrator terminal, where the group administrator terminal is determined by an upper layer or an access layer, and the group administrator terminal may be also referred to as a group head terminal; and
- a target group member terminal, where the target group member terminal is determined by a group administrator terminal or the network device (such as a base station), and the group administrator terminal is determined by an upper layer or access layer.

In specific implementation, the upper layer may determine the group administrator terminal based on application and other statuses. The access (Access Stratum, AS) layer may determine the group administrator terminal based on a group management mechanism of the AS layer; in this case, the group administrator terminal may be also referred to as an AS group administrator terminal.

The target terminal and the group member terminal in this embodiment may belong to the same group, or may belong to different groups. In an implementation, UE (group member UE or group administrator UE) in a group may request allocation of a resource for other group member UEs in the group.

The group administrator terminal in the group may be also understood as a group member terminal in some cases. For example, in a case that the target group member terminal requests allocation of a resource for other group member terminals, the other group member terminals may include a corresponding group administrator terminal. For another example, when the target terminal requests the network side to allocate the resource only for the target terminal, not for other group member terminals, it can be understood that the target terminal is both a group administrator terminal and a group member terminal in this case.

In an implementation, terminals in a group, including a group administrator terminal and a group member terminal, may share resources only due to reasons such as the same speed and the same destination, but do not have any service association and do not transmit service-related data. In this case, the group administrator terminal in the group may be determined by the access layer.

In another implementation, terminals in a group, including a group administrator terminal and a group member terminal, have service association and may communicate with each other. In this case, the group administrator terminal in the group may be determined by the upper layer.

Step 102: Receive, from the network device, the information related to the source.

It can be understood that the resource in this embodiment optionally includes at least one of a dynamically scheduled resource, a semi-persistent scheduling (SPS) resource, and a resource pool.

The semi-persistent scheduling resources may be divided into type-1 and type-2 (or referred to as type-A and type-B). The semi-persistent scheduling resource type-1 can be used immediately after being configured by using the RRC message. The semi-persistent scheduling resource type-2 needs to be activated by using downlink control information (DCI) after being configured by using the RRC message. After the network device allocates resources to the terminal, the terminal uses these specific resources for transmission.

The resource pool may be understood as a set of a plurality of time-frequency resources. After the network device allocates a resource pool to the terminal, the terminal further needs to select, from the resource pool based on random selection, a sensing procedure, or other mechanisms, a specific portion of resources for transmission.

Step 103: Transmit the information related to the resource to a group member terminal.

If the network device transmits a rejection message to the target terminal in response to the first request information, that is, rejects to transmits, to the target terminal, resources to be used by the group member terminal, the target terminal may transmit a rejection message to the group member terminal, or not transmit any information to the group member terminal.

It can be understood that the target terminal in this embodiment may request resources for one or more group member terminals in one resource request procedure. When requesting resources for one group member terminal, the target terminal may directly transmit the received information about the resource to the group member terminal. When requesting resources for a plurality of group member terminals, the target terminal may receive information related to the plurality of resources. In this case, the target terminal may transmit information related to each resource to a corresponding group member terminal; or may transmit the information related to the plurality of resources to each group member terminal, and then the group member terminal selects a resource.

In the method for resource allocation in this embodiment of this disclosure, the first request information is transmitted to the network device, and the first request information is used to request allocation of the resource. The information related to the resource is received from the network device, and the information related to the resource is transmitted to the group member terminal. In this way, in scenarios of the current resource allocation mode 2d or other resource allocation modes, resource allocation is implemented for the group member terminal, thereby ensuring smoothness of the corresponding communication procedure.

In this embodiment of this disclosure, optionally, the first request information includes at least one of the following:
  a group identifier (group ID);
  a total quantity of group member terminals;
  a quantity of group member terminals requiring resource allocation;
  an identifier of a group administrator terminal;
  an identifier of a group member terminal;
  an identifier of a group member terminal requiring resource allocation;
  switching request information, where the switching request information is used to request to switch a resource allocation mode;
  time information of one or more to-be-transmitted services, where the time information may include at least one of duration, a interval time, a period, a start time, an end time, and so on; and
  quality of service (QoS) information of one or more to-be-transmitted services, where the QoS information may include at least one of QoS configuration information (QoS profile) or proximity service QoS indication (ProSe QoS Indication, PQI), data rate, a minimum communication range, and the like.

Optionally, the information related to the resource includes at least one of the following:
  one or more pieces of resource configuration information;
  an identifier of a group administrator terminal corresponding to the resource configuration information;
  an identifier of a group member terminal corresponding to the resource configuration information;
  an identifier of a group corresponding to the resource configuration information;
  one or more pieces of switching acknowledgement information, where the switching acknowledgement information is used to initiate or confirm switching of a resource allocation mode;
  an identifier of a group administrator terminal corresponding to the switching acknowledgement information;
  an identifier of a group member terminal corresponding to the switching acknowledgement information;
  an identifier of a group corresponding to the switching acknowledgement information; and
  release condition information corresponding to the resource configuration information; where
  the identifier may include at least one of the following: a destination identifier destination ID, a source identifier source ID, and a terminal identifier UE ID. The UE ID may be an international mobile subscriber identification number (IMSI), a 5G-S-TMSI, and other IDs that can be used for identifying a specific terminal.

It should be noted that a form of all IDs involved in this embodiment may be at least one of an upper layer ID, a layer 2 ID, and a physical layer ID.

In this embodiment of this disclosure, the resource configuration information may include configuration information corresponding to a dynamically scheduled or semi-persistent scheduling resource, and/or configuration information corresponding to a resource pool. The configuration information corresponding to the dynamically scheduled or semi-persistent scheduling resource includes specific time-frequency resources and some other parameters, such as logical channel configuration information. The configuration information corresponding to the resource pool includes information about a resource pool including some time-frequency resource sets, and some other parameters, such as a transmission parameter.

Optionally, the configuration information corresponding to the dynamically scheduled or semi-persistent scheduling resource may include at least one of the following:
  configured grant type-1 (configured grant Type-1) for sidelink;
  configured grant type-2 for sidelink;
  time-frequency information of the SPS resource used for sidelink;
  time-frequency information of the dynamically scheduled resource used for sidelink;
  periodicity information corresponding to the resource;
  validation duration information corresponding to the resource; and
  logical channel configuration information corresponding to the resource.

Optionally, the configuration information corresponding to the resource pool may include at least one of the following:
  periodicity information corresponding to the resource pool;
  validation duration information corresponding to the resource pool;
  logical channel configuration information corresponding to the resource pool;
  a transmission parameter corresponding to the resource pool; and
  zone information.

Type-1 and Type-2 described above are specific to the semi-persistent scheduling resource and are concepts with reference to those of the Uu interface. Actually, the sidelink may also be referred to as type-A and type-B, or the like.

In this embodiment of this disclosure, optionally, when the target terminal is a group administrator terminal, a precondition for transmitting the first request information by the target terminal to the network device may include at least one of the following:
  that the target terminal has entered a coverage of the network device from outside the coverage of the network device;
  that the target terminal has determined, according to an interface availability judgment rule, that a Uu interface is available;
  that an access layer of the target terminal has reported Uu interface availability (Uu available) information to an upper layer;
  that a resource allocation mode in which the target terminal works includes a resource allocation mode 1, where the target terminal works at least in the resource allocation mode 1, or may simultaneously work in the mode 1 and mode 2;

that the target terminal is in an RRC connected state;

that a resource allocation mode in which the target terminal works includes a resource allocation mode 2d, where the target terminal works at least in the resource allocation mode 2d;

that the target terminal has performed a cell selection or reselection procedure or a cell handover procedure;

that a terminal capability of the target terminal supports transmitting, to another terminal, a resource allocated by the network device;

that a terminal capability of the target terminal supports a resource allocation mode 2d;

that the target terminal has received request messages from N group member terminals, where the request message is used to request the target terminal to allocate a resource to a corresponding group member terminal, and N is a positive integer;

that the target terminal has received measurement reports of M group member terminals, where the measurement report is used to indicate that a corresponding group member terminal has encountered channel congestion or channel interference in sidelink communication, for example, a constant bit rate (CBR) exceeds a specific threshold, or a reference signal received power (Reference Signal Receiving Power, RSRP) is less than a specific threshold, or a reference signal received quality (Reference Signal Receiving Quality, RSRQ) is less than a specific threshold; and M is a positive integer (that is, a positive integer greater than or equal to 1); and that the target terminal has not perceived available or sufficient resources in a resource sensing procedure.

In an implementation, when the target terminal is in an RRC connected state and in a case that the terminal capability of the target terminal supports transmitting, to another terminal, a resource allocated by the network device, and request messages (the request message is used to request allocation of the resource) from N group member terminals are received, the target terminal may transmit the first request information to the network device. In this way, allocating resources to the corresponding group member terminals can be implemented.

In another implementation, when the target terminal is in an RRC connected state and in a case that the terminal capability of the target terminal supports transmitting, to another terminal, a resource allocated by the network device, and measurement reports (for example, the measurement report indicates that the CBR exceeds a preset threshold) from M group member terminals are received, the target terminal may transmit the first request information to the network device. In this way, allocating resources to the corresponding group member terminals can be implemented.

In another implementation, in a case that the target terminal is in an RRC idle state or an RRC inactive state and has been working in the resource allocation mode 2d to allocate resources to other UEs, and that the cell reselection procedure is performed, after the target terminal completes reselection, an RRC connection establishment procedure may be initiated in a new cell, and after the RRC connection establishment procedure is completed, the network device may request new resources to be allocated to other group member UEs.

In this embodiment of this disclosure, optionally, step 103 may include any one of the following:

in a case that the information related to the resource includes X pieces of resource configuration information and a group identifier, transmitting the X pieces of resource configuration information to corresponding X group member terminals based on the group identifier, where, to be specific, the X pieces of resource configuration information are transmitted together to the corresponding X group member terminals; in this case, each group member terminal may receive respective corresponding resource configuration information; or select respective corresponding resource configuration information after receiving the X pieces of resource configuration information;

in a case that the information related to the resource includes X pieces of resource configuration information and a group identifier and the target terminal knows a source ID or UE ID of each group member terminal, transmitting the X pieces of resource configuration information to corresponding X group member terminals respectively;

in a case that the information related to the resource includes X pieces of resource configuration information, and a source ID or UE ID that corresponds to each piece of resource configuration information, transmitting each piece of resource configuration information to a corresponding group member terminal, where the group member terminal corresponds to the source ID or UE ID; and in a case that the information related to the resource includes X pieces of resource configuration information, and a destination ID that corresponds to each piece of resource configuration information, transmitting each piece of resource configuration information to a corresponding group member terminal, where the group member terminal corresponds to a source ID or UE ID, and the source ID or UE ID corresponds to the destination ID; where X is a positive integer. X may be a total quantity of group member terminals, the foregoing N, or the foregoing M. The resource configuration information may optionally be resource pool configuration information. In this way, the resource configuration information can be transmitted to the corresponding group member terminal.

In this embodiment of this disclosure, the target terminal is optionally a target group member terminal. The target group member terminal may be entrusted by the corresponding group administrator terminal or the network device, or be determined entirely based on an independent mechanism.

Optionally, when the target terminal is a target group member terminal, before step 101, the method may further include:

receiving second request information from the group administrator terminal; where the second request information is used to request the target group member terminal to perform resource scheduling, for example, to perform mode 2d resource scheduling.

Optionally, a transmitting condition of the second request information may include at least one of the following:

that the group administrator terminal is located outside a coverage of the network device;

that the group administrator terminal has determined, according to an interface availability judgment rule, that a Uu interface is unavailable;

that an access layer of the group administrator terminal has reported Uu interface unavailability (Uu unavailable) information to an upper layer;

that the group administrator terminal is in an RRC idle state or RRC inactive state;

that the group administrator terminal has initiated an RRC connection establishment procedure, but the initiated RRC connection establishment procedure failed;

that the group administrator terminal has initiated an RRC connection recovery procedure, but the initiated RRC connection recovery procedure failed;

that the group administrator terminal has initiated an RRC connection reestablishment procedure, but the initiated RRC connection reestablishment procedure failed;

that the group administrator terminal has encountered an uplink radio link failure;

that the group administrator terminal has performed switching of an uplink bandwidth part (UL BWP);

that a current UL BWP of the group administrator terminal has been deactivated;

that the group administrator terminal is configured with carrier aggregation (CA) or dual connectivity (Dual-Connectivity, DC), and a secondary cell (Scell) has been deactivated;

that the group administrator terminal has performed a cell selection or reselection procedure or a cell handover procedure;

that a terminal capability of the group administrator terminal does not support transmitting, to another terminal, a resource allocated by the network device;

that a terminal capability of the group administrator terminal does not support the resource allocation mode 2d;

that the group administrator terminal has received request messages from N group member terminals, where the request message is used to request the group administrator terminal to allocate a resource to a corresponding group member terminal, and N is a positive integer;

that the group administrator terminal has received measurement reports of M group member terminals, where the measurement report is used to indicate that a corresponding group member terminal has encountered channel congestion or channel interference in sidelink communication, for example, the CBR exceeds a specific threshold, and M is a positive integer;

that the group administrator terminal has not perceived available or sufficient resources in a resource sensing procedure;

that the group administrator terminal has used uplink timing in sidelink communication, but uplink asynchronization occurred;

that the target group member terminal is located within the coverage of the network device;

that the target group member terminal has determined, according to an interface availability judgment rule, that a Uu interface is available;

that an access layer of the target group member terminal has reported Uu interface availability information to an upper layer;

that a resource allocation mode in which the target group member terminal works includes mode 1, that is, the target group member terminal works at least in mode 1;

that the target group member terminal is in an RRC connected state;

that a terminal capability of the target group member terminal supports transmitting, to another terminal, a resource allocated by the network device; and that a terminal capability of the target group member terminal supports the resource allocation mode 2d.

In an implementation, if the group administrator terminal receives request messages from N group member terminals, where the request message is used to request allocation of resources, but the group administrator terminal is in an RRC idle state or inactive state (or the terminal capability of the group administrator terminal does not support transmitting resources allocated by the base station to other terminals), and the group member terminal such as UE-1 is in an RRC connected state, and the terminal capability of UE-1 supports transmitting resources allocated by the base station to other terminals, then the group administrator terminal may entrust the UE-1, to request UE-1 to be responsible for communicating with the base station, reporting related information, and transmitting resources allocated by the base station to other UEs. In this case, the UE-1 is the target group member UE.

In another implementation, if the group administrator terminal works in the resource allocation mode 2d and allocates resources to other group member UEs, but the group administrator terminal enters the coverage of the base station, then the group administrator terminal may use the sidelink to communicate with another group member UE-1 located within the coverage of the base station, to request the UE-1 to be responsible for communicating with the base station, reporting related information, and transmitting new resources allocated by the base station to other UEs. In this case, the UE-1 is the target group member UE.

In this embodiment of this disclosure, switching of the resource allocation mode 2d and resource allocation may means that only some UEs in the group perform switching and use mode-2d for scheduling resources for the UE. When this is valid only for some UEs, the target terminal needs to negotiate in advance with the group member terminals.

Optionally, before step 101, the method may further include:

transmitting switching negotiation information to related group member terminals, where the related group member terminals are optionally all corresponding group member terminals or part of corresponding group member terminals; and receiving switching negotiation acceptance information from Y group member terminals of the related group member terminals.

The switching negotiation information is information used for negotiating future use of a resource that is obtained through requesting by the target terminal from the network device, the first request information is used to request a resource for the Y group member terminals, and Y is a positive integer. In this way, with the negotiation procedure, which group member terminals resources are requested for can be determined.

Optionally, a transmitting condition of the switching negotiation acceptance information may include at least one of the following:

that a resource allocation mode in which the group member terminal works includes a resource allocation mode 2a and/or the resource allocation mode 2d;

that the group member terminal has not perceived available or sufficient resources in a resource sensing procedure;

that the group member terminal has encountered channel congestion or channel interference in sidelink communication, for example, a CBR exceeds a specific threshold, an RSRP is less than a specific threshold, or an RSRQ is less than a specific threshold;

that a terminal capability of the group member terminal supports the resource allocation mode 2d;

that the group member terminal is in an RRC idle state or RRC inactive state; and up to implementation of the group member terminal (up to UE implementation).

Optionally, the switching negotiation acceptance information may include at least one of the following:

indication information used to indicate agreeing to switch the resource allocation mode;

a destination ID;

a source ID;

a UE ID; and resource configuration information currently used by the group member terminal.

Optionally, after the transmitting the switching negotiation information to all the group member terminals, the method may further include:

receiving switching negotiation rejection information from Z group member terminals of the related group member terminals; where Z is a positive integer.

A transmitting condition of the switching negotiation rejection information includes at least one of the following:

that the group member terminal works in the resource allocation mode 1;

that the group member terminal has perceived sufficient available resources in a resource sensing procedure;

that the group member terminal has encountered no channel congestion or channel interference in sidelink communication;

that a terminal capability of the group member terminal does not support the resource allocation mode 2d;

that the group member terminal is in an RRC connected state; and up to implementation of the group member terminal.

In an implementation, in a case of negotiation, the group administrator terminal may transmit the switching negotiation information to K related group member terminals (that is, related group member terminals, where K is optionally be a total quantity of or a partial quantity of the group member terminals), then receive the switching negotiation acceptance information from Y (Y is less than K) group member terminals, receive the switching negotiation rejection information from Z (Z is less than K) group member terminals, and transmit request information to the base station, so as to requests resource allocation for the Y group member terminals.

In another implementation, in a case that there is no negotiation and Y group member terminals request resources from the group administrator terminal, the group administrator terminal may transmit the request information to the base station, so as to request resource allocation for the Y group member terminals.

In another implementation, in a case that there is no negotiation and no group member terminal requests resources from the group administrator terminal, the group administrator terminal may transmit the request information to the base station, so as to request resource allocation for X group member terminals, where X is optionally a total quantity of or a partial quantity of the group member terminals.

It should be noted that the target terminal may transmit the switching negotiation information to all the group member terminals after the condition for transmitting the first request information is met; or may transmit the switching negotiation information to all the group member terminals before the condition for transmitting the first request information is met and then after receiving the switching negotiation acceptance information, determine whether the condition for transmitting the first request information is met.

In this embodiment of this disclosure, after the resource request and allocation are completed, the corresponding resource configuration information may be released. Release manners may include at least the following three types:

Manner 1:

In manner 1, release of the resource configuration information is initiated by the target terminal.

Optionally, after step 103, the method further includes:

transmitting a first release message to the group member terminal, and/or send the first release message to the network device.

The first release message is used to indicate resource configuration information released by the target terminal and/or resource configuration information that needs to be released by the group member terminal. In this way, with the first release message, which resources need to be released may be notified to the group member terminal, and with the notification to the network device, the network device may use a released resources for other scheduling.

Optionally, a transmitting condition of the first release message may include at least one of the following:

that the target terminal meets a preset release condition, where the release condition may be configured by the network device; in this case, the network device may transmit corresponding release condition information to the target terminal when transmitting the information related to the resource to the target terminal, or transmit the corresponding release condition information to the target terminal before or after transmitting the information related to the resource, where the release condition may include a configured resource not being in a valid time or not being in a valid area, or the like; and that the target terminal has received a release request message from the group member terminal.

The release request message may include at least one of the following:

indication information for requesting to release the resource configuration information;

a destination ID corresponding to resource configuration information that is requested to release;

a source ID corresponding to the resource configuration information that is requested to release;

a UE ID corresponding to the resource configuration information that is requested to release; and the resource configuration information that is requested to release.

Optionally, a transmitting condition of the first release message may further include at least one of the following:

(1) that the target terminal has moved out of a coverage of the network device;

(2) that the target terminal has determined, according to an interface availability judgment rule, that a Uu interface is unavailable;

(3) that an access layer of the target terminal has reported Uu interface unavailability information to an upper layer;

(4) that the target terminal has entered an RRC idle state or RRC inactive state;

(5) that the target terminal has initiated an RRC connection establishment procedure, but the initiated RRC connection establishment procedure failed;

(6) that the target terminal has initiated an RRC connection recovery procedure, but the initiated RRC connection recovery procedure failed;

(7) that the target terminal has initiated an RRC connection reestablishment procedure, but the initiated RRC connection reestablishment procedure failed;

(8) that the target terminal has encountered an uplink radio link failure;

(9) that the target terminal has used uplink timing in sidelink communication, but uplink asynchronization occurred;

(10) that the target terminal has performed UL BWP switching, where in this case, the first release message may be transmitted to the network device on a new UL BWP; or the first release message is not transmitted to the network device;

(11) that the target terminal has performed a cell selection or reselection procedure or a cell handover procedure, where in this case, the first release message may be transmitted to a new network device, and the new network device notifies the original network device, namely the original network device; or the first release message is not transmitted to the network device;

(12) that a terminal capability of the target terminal does not support transmitting, to another terminal, a resource allocated by the network device;

(13) that a terminal capability of the target terminal does not support a resource allocation mode 2d;

(14) that a current UL BWP of the target terminal has been deactivated;

(15) that the target terminal is configured with CA or DC, and an SCell has been deactivated, where in this case, the first release message may be transmitted to the network device in a primary cell (Pcell) or a primary secondary cell (PScell); or the first release message is not transmitted to the network device; and

(16) up to implementation of the target terminal (up to UE implementation).

For the transmitting conditions (1) to (3), the target terminal does not transmit the first release message to the network device because the target terminal is located outside the coverage of the network device or the UU interface is unavailable. However, the target terminal may transmit the first release message to the network device again when the target terminal enters the coverage of the network device next time, the UU interface becomes available again, or there is an RRC connection to the network device; or the first release message is not transmitted to the network device. For the transmitting conditions (4) to (9), the target terminal may transmit the first release message to the network device again when there is an RRC connection to the network device next time; or the first release message is not transmitted to the network device.

Optionally, the first release message may include at least one of the following:
  indication information for agreeing to or initiating release of resource configuration information;
  a destination ID corresponding to resource configuration information that needs to be released;
  a source ID corresponding to resource configuration information that needs to be released;
  a UE ID corresponding to resource configuration information that needs to be released; and
  the resource configuration information that needs to be released.

Manner 2:

In manner 2, release of the resource configuration information is initiated by the group member terminal.

Optionally, after step 103, the method may further include:
  receiving a second release message from the group member terminal.

The second release message is used to indicate resource configuration information released by the group member terminal. In this case, the target terminal may notify the network device of the resource configuration information released by the group member terminal, so that the network device may use released resources for other scheduling.

In this way, with the second release message, the target terminal can learn which resources have been released by the corresponding group member terminal.

During specific implementation, the second release message may alternatively be transmitted to the network device by the group member terminal, so that the network device may use the released resources for other scheduling.

Optionally, the second release message may include at least one of the following:
  that channel congestion or channel interference has been detected when the group member terminal performs transmission by using related resource configuration information, for example, the CBR exceeds a preset threshold;
  that the group member terminal has encountered a sidelink radio link failure;
  that transmission of a service of the group member terminal has stopped; and
  up to implementation of the group member terminal.

Optionally, the second release message may include at least one of the following:
  a destination ID corresponding to resource configuration information that needs to be released;
  a source ID corresponding to resource configuration information that needs to be released;
  a UE ID corresponding to resource configuration information that needs to be released; and
  the resource configuration information that needs to be released.

Manner 3:

In manner 3, release of the resource configuration information is initiated by the network device.

Optionally, after step 103, the method further includes:
  receiving a third release message from the network device; where
  the third release message is used to indicate resource configuration information, released by the network device, of the group administrator terminal, and/or resource configuration information, released by the network device, of the group member terminal. In this way, with the third release message, the target terminal can learn which resources have been released by the network device.

Optionally, a transmitting condition of the third release message may include at least one of the following:
  that the network device has received a release request message from the group administrator terminal;
  that the network device has received a release request message from the group member terminal; and
  up to implementation of the network device (up to eNB implementation).

Optionally, the release request message may include at least one of the following:
  indication information for requesting to release the resource configuration information;

a destination ID corresponding to resource configuration information that is requested to release;
a source ID corresponding to the resource configuration information that is requested to release;
a UE ID corresponding to the resource configuration information that is requested to release; and
the resource configuration information that is requested to release.

Optionally, the third release message may include at least one of the following:
indication information for agreeing to or initiating release of resource configuration information;
a destination ID corresponding to resource configuration information that needs to be released;
a source ID corresponding to resource configuration information that needs to be released;
a UE ID corresponding to resource configuration information that needs to be released; and
the resource configuration information that needs to be released.

In an implementation, the group administrator UE uniformly requests release of resource configuration information of all related group member UEs (such as UEs configured with a mode 2d resource pool). In this case, the base station transmits a release message (which is the third release message) to the group administrator UE, and the group administrator UE transmits the release message to the related group member UEs.

In another implementation, the group administrator UE uniformly requests release of the resource configuration information of all related group member UEs (such as UEs configured with a mode 2d resource pool). In this case, the base station may transmit a release message to the group administrator UE and group member UEs having an RRC connection to the base station, that is, release messages of some group member UEs are transmitted directly by the base station, not requiring forwarding by the group manager UE.

In another implementation, the group administrator UE requests release of the resource configuration information of some group member UEs, and other group member UEs having an RRC connection to the base station request release of the resource configuration information by themselves. In this case, the base station may uniformly transmit the release message to the group administrator UE and then the group administrator UE performs forwarding; or may separately transmit the release message to the group administrator UE and group member UEs that request release.

In this embodiment of this disclosure, in all cases that resource release is initiated by the terminal side, it is likely to suspend the resource configuration information, but not releasing the resource configuration information, and when a specific condition is subsequently met, the resource configuration information is resumed or released. In this case, the resource corresponding to the resource configuration information may be a semi-persistent scheduling resource type-1 (for example, sidelink grant type-1), or a resource pool.

Optionally, after step 103, the method may further include:
processing resource configuration information; where the processing includes any one of the following:
suspending, suspending and resuming, and suspending and releasing.

Optionally, the processing resource configuration information may include any one of the following:

suspending the resource configuration information when a preset release condition is satisfied; and in a preset time, restoring the resource configuration information when the preset release condition is no longer satisfied;
suspending the resource configuration information when a release request message is received;
suspending the resource configuration information when the target terminal enters the coverage of the network device; and in a preset time, resuming the resource configuration information when the target terminal enters the coverage of the network device;
suspending the resource configuration information when the target terminal determines, according to an interface availability judgment rule, that the Uu interface is unavailable; and in a preset time, resuming the resource configuration information when the target terminal determines that the Uu interface is available;
suspending the resource configuration information when the access layer of the target terminal reports Uu interface unavailability information to the upper layer; and in a preset time, resuming the resource configuration information when the access layer of the target terminal reports Uu interface availability information to the upper layer;
suspending the resource configuration information when the target terminal enters an RRC idle state or inactive state; and in a preset time, resuming the resource configuration information when the target terminal enters an RRC connected state;
suspending the resource configuration information when the target terminal initiates an RRC connection establishment procedure but the initiated RRC connection establishment procedure fails; and in a preset time, resuming the resource configuration information when the target terminal successfully initiates the RRC connection establishment procedure; or in a preset time, releasing the resource configuration information when all RRC connection establishment procedures initiated for a preset quantity of times by the target terminal fail;
suspending the resource configuration information when the target terminal initiates an RRC connection restoring procedure but the initiated RRC connection restoring procedure fails; and in a preset time, resuming the resource configuration information when the target terminal successfully initiates the RRC connection restoring procedure; or in a preset time, releasing the resource configuration information when all RRC connection restoring procedures initiated for a preset quantity of times by the target terminal fail;
suspending the resource configuration information when the target terminal initiates an RRC connection reestablishment procedure but the initiated RRC connection reestablishment procedure fails; and in a preset time, resuming the resource configuration information when the target terminal successfully initiates the RRC connection reestablishment procedure; or in a preset time, releasing the resource configuration information when all RRC connection reestablishment procedures initiated for a preset quantity of times by the target terminal fail;
suspending the resource configuration information when the target terminal has an uplink radio link failure; and in a preset time, resuming the resource configuration information when the target terminal successfully initiates an uplink radio link recovery procedure; or in a preset time, releasing the resource configuration information when all uplink radio link recovery procedures initiated for a preset quantity of times by the target terminal fail;

suspending the resource configuration information when the target terminal performs UL BWP switching; and in a preset time, resuming the resource configuration information when the target terminal hands over back to an original UL BWP (that is, a previous UL BWP); or in a preset time, releasing the resource configuration information when the target terminal does not hand over back to the original UL BWP;

releasing the resource configuration information when the target terminal performs a cell selection or reselection procedure or a cell handover procedure;

suspending the resource configuration information when the terminal capability of the target terminal does not support transmitting, to another terminal, a resource allocated by the network device; and in a preset time, resuming the resource configuration information when the terminal capability of the target terminal is resumed to support transmitting, to another terminal, a resource allocated by the network device;

suspending the resource configuration information when the terminal capability of the target terminal does not support the resource allocation mode 2d; and in a preset time, resuming the resource configuration information when the terminal capability of the target terminal is resumed to support the resource allocation mode 2d;

suspending the resource configuration information when a current UL BWP of the target terminal has been deactivated; and resuming the resource configuration information when the current UL BWP of the target terminal is activated again in a preset time;

suspending the resource configuration information when the target terminal is configured with CA or DC, and an SCell has been deactivated; and resuming the resource configuration information when the SCell is activated again in a preset time; and suspending the resource configuration information when the target terminal uses uplink timing in sidelink, but uplink asynchronization occurs; and resuming the resource configuration information when uplink timing is resumed in a preset time; or resuming the resource configuration information when a random access (Random Access Channel, RACH) procedure is initiated due to uplink asynchronization and the random access procedure is successful, or releasing the resource configuration information when the random access procedure fails.

It can be understood that the preset time is optionally time T and is determined in any one of the following manners: being configured by the network device, being configured by the target terminal, being specified by the protocol, being preconfigured, and up to implementation of the terminal.

Figure 2:
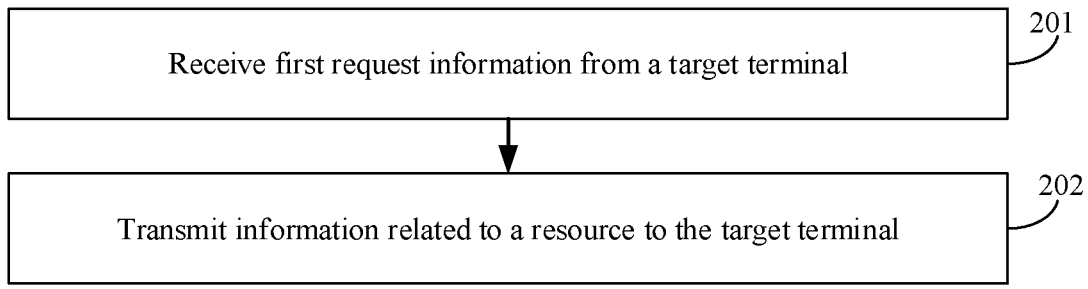
FIG. 2 is a flowchart of another method for resource allocation according to an embodiment of this disclosure.

Referring to FIG. 2, FIG. 2 is a flowchart of a method for resource allocation according to an embodiment of this disclosure. The method is applied to a network device, and as shown in FIG. 2, the method includes the following steps.

Step 201: Receive first request information from a target terminal.

The first request information is used to request allocation of a resource.

Step 202: Transmit the information related to the resource to the target terminal.

In the method for resource allocation in this embodiment of this disclosure, in scenarios of the current resource allocation mode 2d or other resource allocation modes, resource allocation is implemented for the group member terminal, thereby ensuring smoothness of the corresponding communication procedure.

Optionally, the target terminal is any one of the following:
a group administrator terminal, where the group administrator terminal is determined by an upper layer or access layer; and
a target group member terminal, where the target group member terminal is determined by a group administrator terminal or the network device, and the group administrator terminal is determined by an upper layer or access layer.

Optionally, the information related to the resource includes at least one of the following:
one or more pieces of resource configuration information;
an identifier of a group administrator terminal corresponding to the resource configuration information;
an identifier of a group member terminal corresponding to the resource configuration information;
an identifier of a group corresponding to the resource configuration information;
one or more pieces of switching acknowledgement information;
an identifier of a group administrator terminal corresponding to the switching acknowledgement information;
an identifier of a group member terminal corresponding to the switching acknowledgement information;
an identifier of a group corresponding to the switching acknowledgement information; and
release condition information corresponding to the resource configuration information; where
the identifier includes at least one of the following: a destination ID, a source ID, or a UE ID, and the switching acknowledgement information is used to initiate or confirm switching of a resource allocation mode.

Optionally, after step 202, the method further includes:
receiving a first release message from the target terminal, where the first release message is used to indicate resource configuration information released by the target terminal and/or resource configuration information that needs to be released by a group member terminal; or
receiving a second release message from a group member terminal, where the second release message is used to indicate resource configuration information released by the group member terminal; or
transmitting a third release message to the target terminal, and/or transmitting a third release message to the group member terminal, where the third release message is used to indicate resource configuration information, released by the network device, of the group administrator terminal, and/or resource configuration information, released by the network device, of the group member terminal.

Optionally, a transmitting condition of the third release message includes at least one of the following:
that the network device has received a release request message from the group administrator terminal;
that the network device has received a release request message from the group member terminal; and
up to implementation of the network device.

Optionally, the release request message includes at least one of the following:
indication information for requesting to release the resource configuration information;

a destination ID corresponding to resource configuration information that is requested to release;

a source ID corresponding to the resource configuration information that is requested to release;

a UE ID corresponding to the resource configuration information that is requested to release; and the resource configuration information that is requested to release.

Optionally, the third release message includes at least one of the following:

indication information for agreeing to or initiating release of resource configuration information;

a destination ID corresponding to resource configuration information that needs to be released;

a source ID corresponding to resource configuration information that needs to be released;

a UE ID corresponding to resource configuration information that needs to be released; and the resource configuration information that needs to be released.

Figure 3:
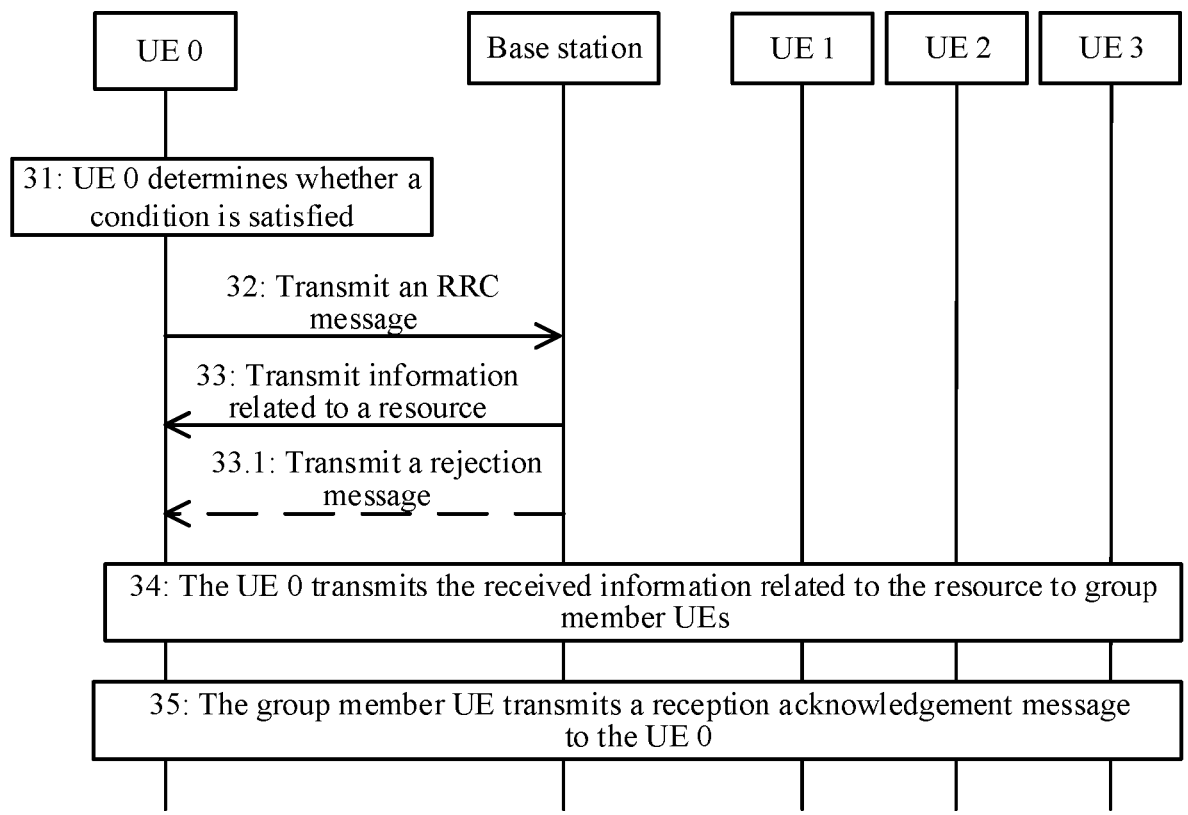
FIG. 3 is a flowchart of a resource allocation procedure in Embodiment 1 of this disclosure.
Figure 4:
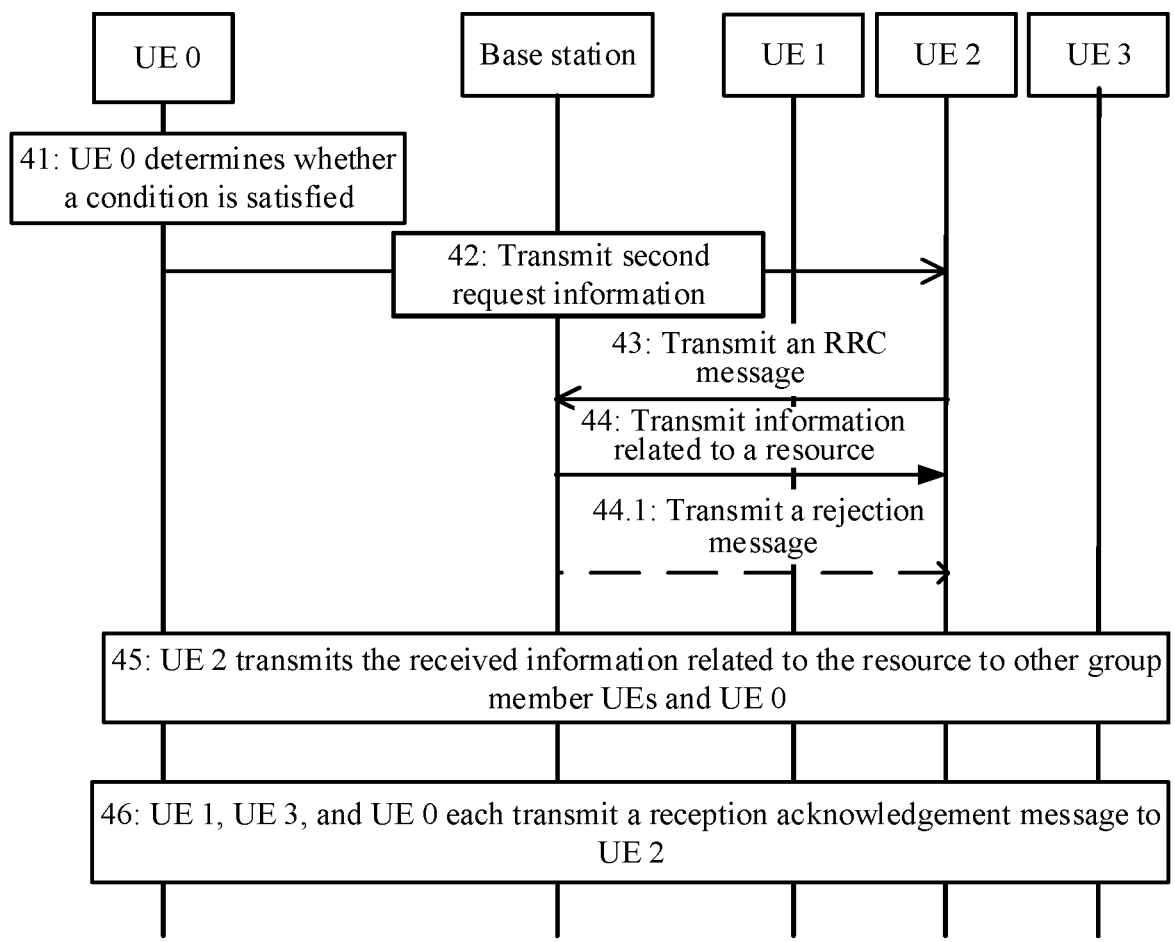
FIG. 4 is a flowchart of a resource allocation procedure in Embodiment 2 of this disclosure.
Figure 5:
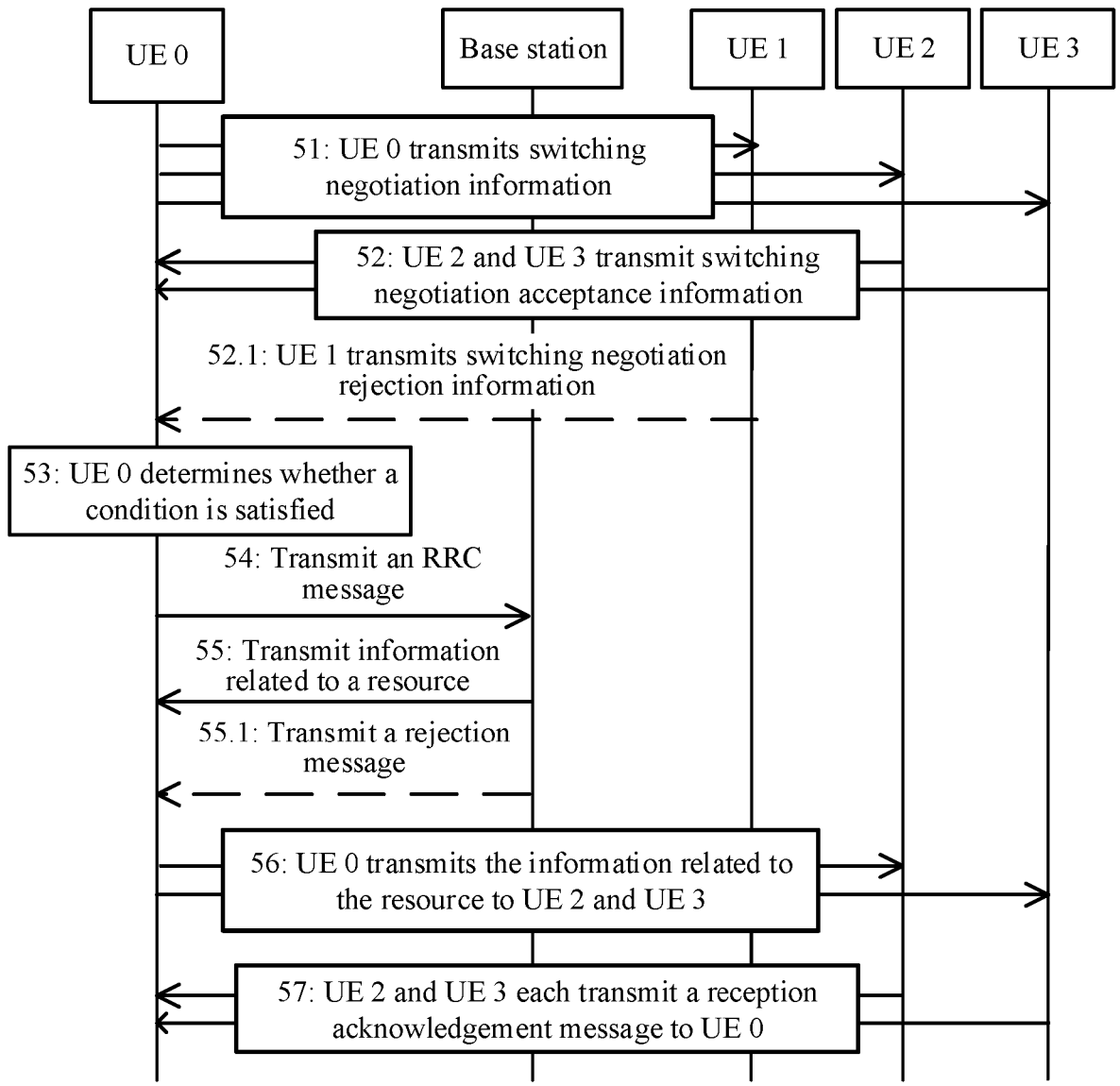
FIG. 5 is a flowchart of a resource allocation procedure in Embodiment 3 of this disclosure.

The following describes the resource allocation procedure in specific embodiments of this disclosure with reference to FIG. 3 to FIG. 5.

Example 1

In Example 1, resource scheduling is performed by the group administrator UE. The group administrator UE in multicast communication of Example 1 is UE 0, and the group member UEs include UE 1, UE 2, and UE 3. The group administrator identity of the UE 0 is determined by the upper layer or the AS layer. As shown in FIG. 3, the corresponding resource allocation procedure includes the following steps.

Step 31: UE 0 determines whether a prerequisite for transmitting the first request information to the base station (such as a gNB or an ng-eNB) is satisfied.

For the prerequisite, refer to the description of the foregoing embodiment in FIG. 1. Details are not described herein again.

Step 32: When the prerequisite is satisfied, the UE 0 transmits an RRC message to the base station.

The first request information is included in the RRC message. For the first request information, refer to the description of the foregoing embodiment in FIG. 1. Details are not described herein again.

Step 33: The base station transmits information related to a resource to the group member UE 0.

For the information related to the resource, refer to the description of the foregoing embodiment in FIG. 1. Details are not described herein again.

Step 33.1: Optionally, the base station transmits a rejection message to the UE 0, to reject transmitting a resource to be allocated subsequently. In this case, the UE 0 transmits a rejection message to the group member UE, or does not transmit any information.

Step 34: The UE 0 transmits the received information related to the resource to the group member UEs, namely UE 1, UE 2, and UE 3.

Step 35: Optionally, the group member UE transmits a reception acknowledgement message to the UE 0.

A form of the reception acknowledgement message is optionally any one of HARQ feedback information, a MAC CE, and an RRC message.

Example 2

In Example 2, resource scheduling is performed by the target group member UE. The group administrator UE in multicast communication of Example 2 is UE 0, and the group member UEs include UE 1, UE 2, and UE 3. The group administrator identity of the UE 0 is determined by the upper layer. The target group member UE is UE 2, and is determined through entrusting of the UE 0 (or the base station) or based on other mechanisms. As shown in FIG. 4, the corresponding resource allocation procedure includes the following steps.

Step 41: The UE 0 determines whether the transmitting condition of the second request information is satisfied.

The second request information is used to request UE 2 to perform resource (such as a sidelink resource) scheduling. For the transmitting condition, refer to the description of the foregoing embodiment in FIG. 1. Details are not described herein again.

Step 42: When the condition is satisfied, the UE 0 transmits the second request information to the UE 2, so as to request the UE 2 to perform resource scheduling.

Step 43: The UE 2 transmits an RRC message to the base station.

The first request information is included in the RRC message. For the first request information, refer to the description of the foregoing embodiment in FIG. 1. Details are not described herein again.

Step 44: The base station transmits information related to a resource to the group member UE 2.

For the information related to the resource, refer to the description of the foregoing embodiment in FIG. 1. Details are not described herein again.

Step 44.1: Optionally, the base station transmits a rejection message to the UE 2, to reject transmitting a resource to be allocated subsequently. In this case, the UE 2 transmits a rejection message to other group member UEs and UE 0, or does not transmit any information.

Step 45: The UE 2 transmits the received information related to the resource to other group member UEs, namely UE 1 and UE 3, and UE 0.

Step 46: Optionally, the UE 1, UE 3, and UE 0 each transmit a reception acknowledgement message to the UE 2.

A form of the reception acknowledgement message is optionally any one of hybrid automatic repeat request (HARQ) feedback information, a media access control control element (MAC CE), and an RRC message.

Example 3

In Example 3, the group administrator UE performs resource scheduling, merely valid for some group member UEs. The group administrator UE in multicast communication of Example 3 is UE 0, and the group member UEs include UE 1, UE 2, and UE 3. The group administrator identity of the UE 0 is determined by the upper layer or the AS layer. As shown in FIG. 5, the corresponding resource allocation procedure includes the following steps.

Step 51: The UE 0 transmits switching negotiation information to related group member UEs.

The related group member UEs are optionally all group member UEs, namely the UE 1, UE 2, and UE 3 (shown in FIG. 5), or some group member UEs such as the UE 1 and UE 2, or the UE 2 and UE 3. For the switching negotiation information, refer to the description of the foregoing embodiment in FIG. 1. Details are not described herein again.

Step 52: The UE 2 and UE 3 transmit switching negotiation acceptance information to the UE 0.

For the switching negotiation acceptance information and the transmitting condition thereof, refer to the description of the foregoing embodiment in FIG. 1. Details are not described herein again.

Step 52.1: Optionally, the UE 1 transmits switching negotiation rejection information to the UE 0.

For the switching negotiation rejection information and the transmitting condition thereof, refer to the description of the foregoing embodiment in FIG. 1. Details are not described herein again.

Step 53: The UE 0 determines whether a prerequisite for transmitting the first request information to the base station (such as a gNB or an ng-eNB) is satisfied.

For the prerequisite, refer to the description of the foregoing embodiment in FIG. 1. Details are not described herein again.

Step 54: When the prerequisite is satisfied, the UE 0 transmits an RRC message to the base station.

The first request information is included in the RRC message, and the first request information is used to request allocation of a resource for the UE 2 and UE 3. For the first request information, refer to the description of the foregoing embodiment in FIG. 1. Details are not described herein again.

Step 55: The base station transmits information related to a resource to the group member UE 0.

For the information related to the resource, refer to the description of the foregoing embodiment in FIG. 1. Details are not described herein again.

Step 55.1: Optionally, the base station transmits a rejection message to the UE 0, to reject transmitting a resource to be allocated subsequently. In this case, the UE 0 transmits a rejection message to the UE 2 and UE 3, or does not transmit any information.

Step 56: The UE 0 transmits the received information related to the resource to the UE 2, and UE 3.

Step 57: Optionally, the UE 2 and UE 3 transmit a reception acknowledgement message to the UE 0.

A form of the reception acknowledgement message is optionally any one of HARQ feedback information, a MAC CE, and an RRC message.

Figure 6:
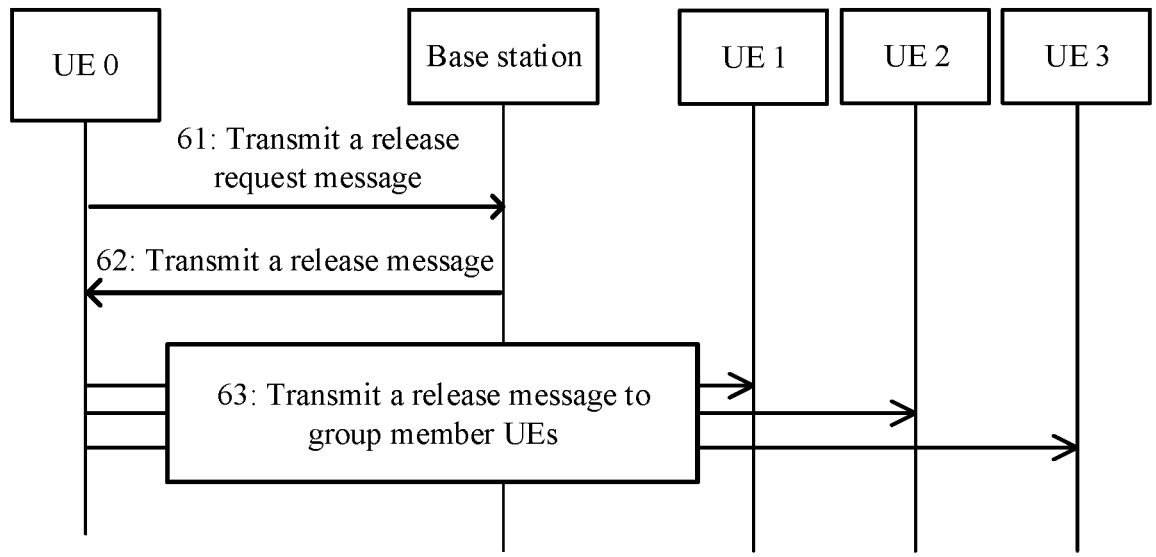
FIG. 6 is a flowchart of a resource release procedure in Embodiment 4 of this disclosure.
Figure 7:
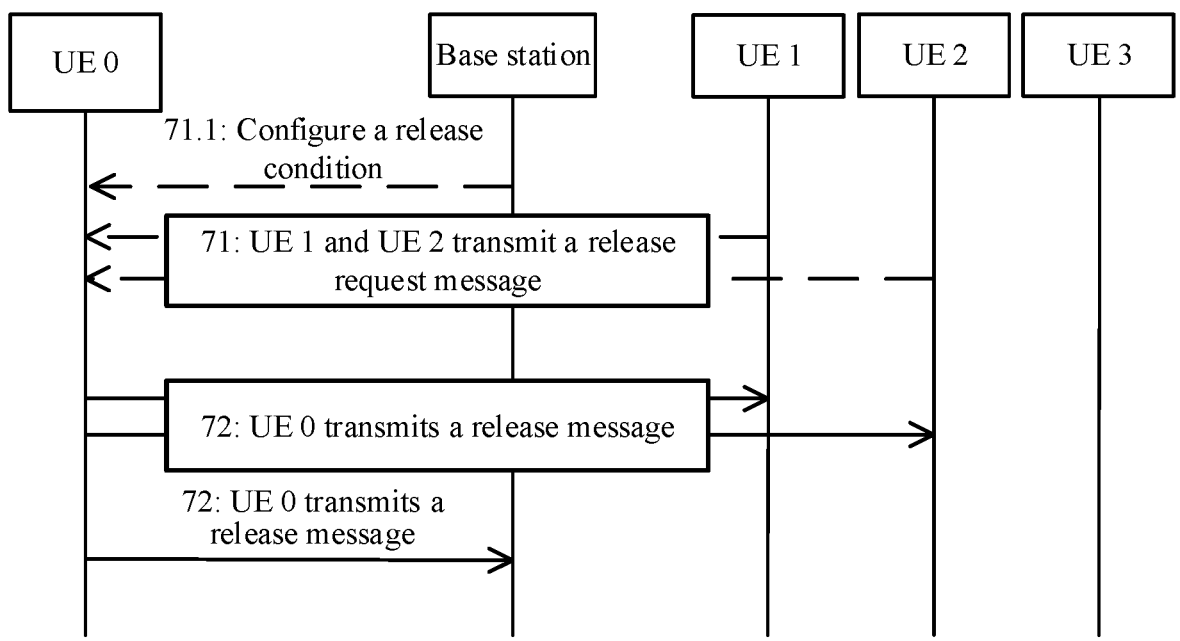
FIG. 7 is a flowchart of a resource release procedure in Embodiment 4 of this disclosure.

The following describes the resource release procedure in specific embodiments of this disclosure with reference to FIG. 6 and FIG. 7.

Example 4

In Example 4, the resource release procedure is initiated by the base station. The group administrator UE in multicast communication of Example 4 is UE 0, and the group member UEs include UE 1, UE 2, and UE 3. As shown in FIG. 6, the corresponding resource release procedure may include the following steps.

Step 61: The UE 0 transmits a release request message to the base station (such as a gNB or an ng-eNB).

For the release request message and the transmitting condition thereof, refer to the description of the foregoing embodiment in FIG. 1. Details are not described herein again.

Step 62: The base station transmits a release message to the UE 0.

For the release message (namely the third release message) and the transmitting condition thereof, refer to the description of the foregoing embodiment in FIG. 1. Details are not described herein again.

Step 63: The UE 0 transmits a release message to the group member UEs, that is, the UE 1, UE 2, and UE 3.

Example 5

In Example 5, the resource release procedure is initiated by the group administrator UE. The group administrator UE in multicast communication of Example 5 is UE 0, and the group member UEs include UE 1, UE 2, and UE 3. As shown in FIG. 7, the corresponding resource release procedure may include the following steps.

Step 71: The UE 1 and UE 2 transmit a release request message to the UE 0.

For the release request message and the transmitting condition thereof, refer to the description of the foregoing embodiment in FIG. 1. Details are not described herein again.

Step 71.1: Optional, the base station may configure a release condition for the UE 0, so that the UE 0 initiates the resource release procedure when the configured release condition is satisfied.

Step 72: The UE 0 transmits a release message to the UE 1 and UE 2, and the base station.

For the release message (namely the first release message) and the transmitting condition thereof, refer to the description of the foregoing embodiment in FIG. 1. Details are not described herein again.

Figure 8:
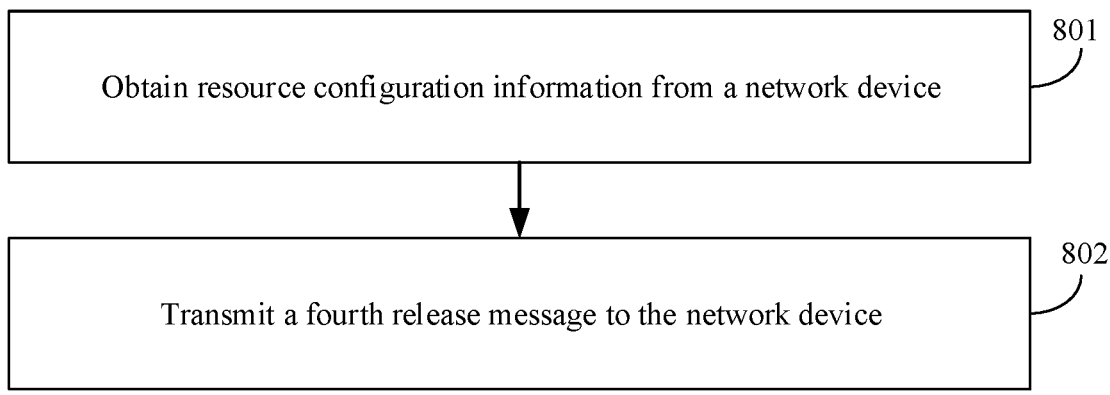
FIG. 8 is a flowchart of a method for resource release according to an embodiment of this disclosure.

Referring to FIG. 8, FIG. 8 is a flowchart of a method for resource release according to an embodiment of this disclosure. The method is applied to a terminal, and as shown in FIG. 8, the method includes the following steps.

Step 801: Obtain resource configuration information from a network device.

The terminal in this embodiment is able to work in a resource allocation mode mode-1. This embodiment is applicable to release of resource configuration information for any mode-1 terminal. For the resource configuration information, refer to the description of the foregoing embodiment in FIG. 1. Details are not described herein again.

Step 802: Transmit a fourth release message to the network device.

The fourth release message is used to indicate resource configuration information released by the terminal.

In the method for resource release in this embodiment of this disclosure, the terminal can release the resource configuration information, and notify the network device.

Optionally, a transmitting condition of the fourth release message includes at least one of the following:

that the terminal meets a preset release condition, where the release condition may be configured by the network device; in this case, the network device may transmit corresponding release condition information to the terminal when transmitting the resource configuration information to the terminal, or transmit the corresponding release condition information to the terminal before or after transmitting the resource configuration information, where the release condition may include a configured resource not being in a valid time or not being in a valid area, or the like;

that the terminal has moved out of a coverage of the network device;

that the terminal has determined, according to an interface availability judgment rule, that a Uu interface is unavailable;

that an access layer of the terminal has reported Uu interface unavailability information to an upper layer;

that the terminal enters an RRC idle state or RRC inactive state;

that the terminal has initiated an RRC connection establishment procedure, but the initiated RRC connection establishment procedure failed;

that the terminal has initiated an RRC connection recovery procedure, but the initiated RRC connection recovery procedure failed;

that the terminal has initiated an RRC connection reestablishment procedure, but the initiated RRC connection reestablishment procedure failed;

that the terminal has encountered an uplink radio link failure;

that the terminal has used uplink timing in sidelink communication, but uplink asynchronization occurred;

that the terminal has performed UL BWP switching;

that the terminal has performed a cell selection or reselection procedure or a cell handover procedure;

that a terminal capability of the terminal does not support transmitting, to another terminal, a resource allocated by the network device;

that a terminal capability of the terminal does not support a resource allocation mode 2d;

that a current UL BWP of the terminal has been deactivated;

that the terminal is configured with CA or DC, and an SCell has been deactivated; and up to implementation of the terminal.

Optionally, the fourth release message includes at least one of the following:

indication information for initiating release of the resource configuration information;

a destination ID corresponding to resource configuration information that needs to be released;

a source ID corresponding to resource configuration information that needs to be released;

a UE ID corresponding to resource configuration information that needs to be released; and the resource configuration information that needs to be released.

Figure 9:
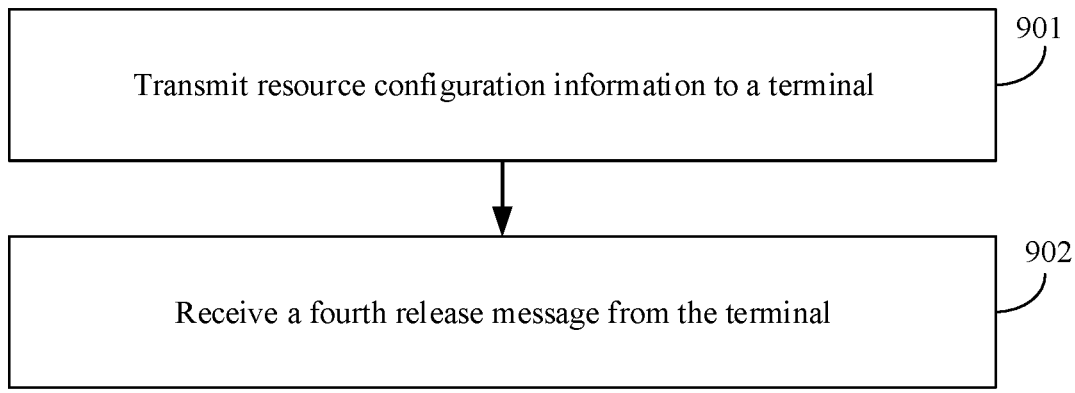
FIG. 9 is a flowchart of another method for resource release according to an embodiment of this disclosure.

Referring to FIG. 9, FIG. 9 is a flowchart of a method for resource release according to an embodiment of this disclosure. The method is applied to a network device, and as shown in FIG. 9, the method includes the following steps.

Step 901: Transmit resource configuration information to a terminal.

The terminal in this embodiment is able to work in a resource allocation mode mode-1. This embodiment is applicable to release of resource configuration information for any mode-1 terminal. For the resource configuration information, refer to the description of the foregoing embodiment in FIG. 1. Details are not described herein again.

Step 902: Receive a fourth release message from the terminal.

The fourth release message is used to indicate resource configuration information released by the terminal.

In the method for resource release in this embodiment of this disclosure, the terminal can release the resource configuration information, and notify the network device.

Optionally, a transmitting condition of the fourth release message includes at least one of the following:

that the terminal meets a preset release condition, where the release condition may be configured by the network device; in this case, the network device may transmit corresponding release condition information to the terminal when transmitting the resource configuration information to the terminal, or transmit the corresponding release condition information to the terminal before or after transmitting the resource configuration information, where the release condition may include a configured resource not being in a valid time or not being in a valid area, or the like;

that the terminal has moved out of a coverage of the network device;

that the terminal has determined, according to an interface availability judgment rule, that a Uu interface is unavailable;

that an access layer of the terminal has reported Uu interface unavailability information to an upper layer;

that the terminal enters an RRC idle state or RRC inactive state;

that the terminal has initiated an RRC connection establishment procedure, but the initiated RRC connection establishment procedure failed;

that the terminal has initiated an RRC connection recovery procedure, but the initiated RRC connection recovery procedure failed;

that the terminal has initiated an RRC connection reestablishment procedure, but the initiated RRC connection reestablishment procedure failed;

that the terminal has encountered an uplink radio link failure;

that the terminal has used uplink timing in sidelink communication, but uplink asynchronization occurred;

that the terminal has performed UL BWP switching;

that the terminal has performed a cell selection or reselection procedure or a cell handover procedure;

that a terminal capability of the terminal does not support transmitting, to another terminal, a resource allocated by the network device;

that a terminal capability of the terminal does not support a resource allocation mode 2d;

that a current UL BWP of the terminal has been deactivated;

that the terminal is configured with CA or DC, and an SCell has been deactivated; and up to implementation of the terminal.

Optionally, the fourth release message includes at least one of the following:

indication information for initiating release of the resource configuration information;

a destination ID corresponding to resource configuration information that needs to be released;

a source ID corresponding to resource configuration information that needs to be released;

a UE ID corresponding to resource configuration information that needs to be released; and the resource configuration information that needs to be released.

The foregoing embodiments describe the method for resource allocation and the method for resource release in this disclosure. The following describes the terminal and the network device in this disclosure with reference to the embodiments and the figures.

Figure 10:
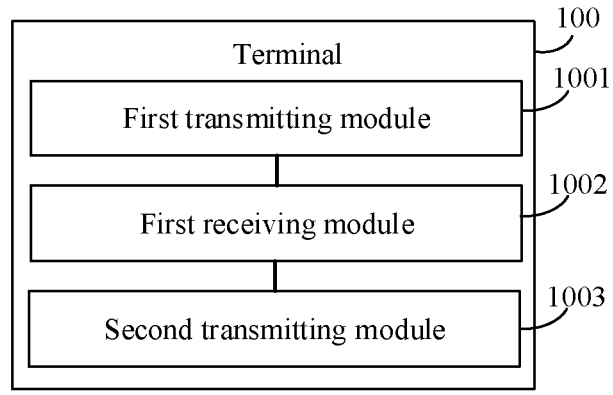
FIG. 10 is a first schematic structural diagram of a terminal according to an embodiment of this disclosure.

Referring to FIG. 10, FIG. 10 is a schematic structural diagram of a terminal according to an embodiment of this disclosure. The terminal is a target terminal. As shown in FIG. 10, the terminal 100 includes:

a first transmitting module 1001, configured to transmit first request information to a network device; where the first request information is used to request allocation of a resource;

a first receiving module 1002, configured to receive, from the network device, information related to the resource; and a second transmitting module 1003, configured to transmit the information related to the resource to a group member terminal.

In this embodiment of this disclosure, optionally, the target terminal is any one of the following:

a group administrator terminal, where the group administrator terminal is determined by an upper layer or access layer; and a target group member terminal, where the target group member terminal is determined by a group administrator terminal or the network device, and the group administrator terminal is determined by an upper layer or access layer.

Optionally, the first request information includes at least one of the following:

a group identifier;

a total quantity of group member terminals;

a quantity of group member terminals requiring resource allocation;

an identifier of a group administrator terminal;

an identifier of a group member terminal;

an identifier of a group member terminal requiring resource allocation;

switching request information;

time information of one or more to-be-transmitted services; and

QoS information of one or more to-be-transmitted services.

The identifier includes at least one of the following: a destination ID, a source ID, or a UE ID; and the switching request information is used to request switching of a resource allocation mode.

Optionally, the information related to the resource includes at least one of the following:

one or more pieces of resource configuration information;

an identifier of a group administrator terminal corresponding to the resource configuration information;

an identifier of a group member terminal corresponding to the resource configuration information;

an identifier of a group corresponding to the resource configuration information;

one or more pieces of switching acknowledgement information;

an identifier of a group administrator terminal corresponding to the switching acknowledgement information;

an identifier of a group member terminal corresponding to the switching acknowledgement information;

an identifier of a group corresponding to the switching acknowledgement information; and release condition information corresponding to the resource configuration information; where the identifier includes at least one of the following: a destination ID, a source ID, or a UE ID, and the switching acknowledgement information is used to initiate or confirm switching of a resource allocation mode.

Optionally, the target terminal is the group administrator terminal.

A prerequisite for transmitting the first request information to the network device includes at least one of the following:

that the target terminal has entered a coverage of the network device from outside the coverage of the network device;

that the target terminal has determined, according to an interface availability judgment rule, that a Uu interface is available;

that an access layer of the target terminal has reported Uu interface availability information to an upper layer;

that a resource allocation mode in which the target terminal works includes a resource allocation mode 1;

that the target terminal is in a radio resource control RRC connected state;

that a resource allocation mode in which the target terminal works includes a resource allocation mode 2d;

that the target terminal has performed a cell selection or reselection procedure or a cell handover procedure;

that a terminal capability of the target terminal supports transmitting, to another terminal, a resource allocated by the network device;

that a terminal capability of the target terminal supports a resource allocation mode 2d;

that the target terminal has received request messages from N group member terminals, where the request message is used to request the target terminal to allocate a resource to a corresponding group member terminal, and N is a positive integer;

that the target terminal has received measurement reports of M group member terminals, where the measurement report is used to indicate that a corresponding group member terminal has encountered channel congestion or channel interference in sidelink communication, and M is a positive integer; and that the target terminal has not perceived available or sufficient resources in a resource sensing procedure.

Optionally, the second transmitting module 1003 is specifically configured to perform any one of the following:

in a case that the information related to the resource includes X pieces of resource configuration information and a group identifier, transmitting the X pieces of resource configuration information to corresponding X group member terminals based on the group identifier;

in a case that the information related to the resource includes X pieces of resource configuration information and a group identifier and the target terminal knows a source ID or UE ID of each group member terminal, transmitting the X pieces of resource configuration information to corresponding X group member terminals respectively;

in a case that the information related to the resource includes X pieces of resource configuration information, and a source ID or UE ID that corresponds to each piece of resource configuration information, transmitting each piece of resource configuration information to a corresponding group member terminal, where the group member terminal corresponds to the source ID or UE ID; and in a case that the information related to the resource includes X pieces of resource configuration information, and a destination ID that corresponds to each piece of resource configuration information, transmitting each piece of resource configuration information to a corresponding group member terminal, where the group member terminal corresponds to a source ID or UE ID, and the source ID or UE ID corresponds to the destination ID; where X is a positive integer.

Optionally, the target terminal is the group administrator terminal. The terminal further includes:

a sixth transmitting module, configured to transmit switching negotiation information to related group member terminals; and a fourth receiving module, configured to receive switching negotiation acceptance information from Y group member terminals of the related group member terminals; where the switching negotiation information is information used for negotiating future use of a resource that is obtained through requesting by the target terminal from the network device, the first request information is used to request a resource for the Y group member terminals, and Y is a positive integer.

Optionally, the switching negotiation acceptance information includes at least one of the following:

that a resource allocation mode in which the group member terminal works includes a resource allocation mode 2a and/or the resource allocation mode 2d;

that the group member terminal has not perceived available or sufficient resources in a resource sensing procedure;

that the group member terminal has encountered channel congestion or channel interference in sidelink communication;

that a terminal capability of the group member terminal supports the resource allocation mode 2d;

that the group member terminal is in an RRC idle state or RRC inactive state; and up to implementation of the group member terminal.

Optionally, the switching negotiation acceptance information includes at least one of the following:

indication information used to indicate agreeing to switch the resource allocation mode;

a destination ID;

a source ID;

a UE ID; and resource configuration information currently used by the group member terminal.

Optionally, the terminal further includes:

a fifth receiving module, configured to receive switching negotiation rejection information from Z group member terminals of the related group member terminals; where Z is a positive integer.

A transmitting condition of the switching negotiation rejection information includes at least one of the following:

that the group member terminal works in the resource allocation mode 1;

that the group member terminal has perceived sufficient available resources in a resource sensing procedure;

that the group member terminal has encountered no channel congestion or channel interference in sidelink communication;

that a terminal capability of the group member terminal does not support the resource allocation mode 2d; or that the group member terminal is in an RRC connected state; and up to implementation of the group member terminal.

Optionally, the target terminal is the target group member terminal. The terminal further includes:

a sixth receiving module, configured to receive second request information from the group administrator terminal.

The second request information is used to request the target group member terminal to perform resource scheduling.

Optionally, a transmitting condition of the second request information includes at least one of the following:

that the group administrator terminal is located outside a coverage of the network device;

that the group administrator terminal has determined, according to an interface availability judgment rule, that a Uu interface is unavailable;

that an access layer of the group administrator terminal has reported Uu interface unavailability information to an upper layer;

that the group administrator terminal is in an RRC idle state or RRC inactive state;

that the group administrator terminal has initiated an RRC connection establishment procedure, but the initiated RRC connection establishment procedure failed;

that the group administrator terminal has initiated an RRC connection recovery procedure, but the initiated RRC connection recovery procedure failed;

that the group administrator terminal has initiated an RRC connection reestablishment procedure, but the initiated RRC connection reestablishment procedure failed;

that the group administrator terminal has encountered an uplink radio link failure;

that the group administrator terminal has performed switching of an uplink bandwidth part UL BWP;

that a current UL BWP of the group administrator terminal has been deactivated;

that the group administrator terminal is configured with carrier aggregation CA or dual connectivity DC, and a secondary cell Scell has been deactivated;

that the group administrator terminal has performed a cell selection or reselection procedure or a cell handover procedure;

that a terminal capability of the group administrator terminal does not support transmitting, to another terminal, a resource allocated by the network device;

that a terminal capability of the group administrator terminal does not support the resource allocation mode 2d;

that the group administrator terminal has received request messages from N group member terminals, where the request message is used to request the group administrator terminal to allocate a resource to a corresponding group member terminal, and N is a positive integer;

that the group administrator terminal has received measurement reports of M group member terminals, where the measurement report is used to indicate that a corresponding group member terminal has encountered channel congestion in sidelink communication, and M is a positive integer;

that the group administrator terminal has not perceived available or sufficient resources in a resource sensing procedure;

that the group administrator terminal has used uplink timing in sidelink communication, but uplink asynchronization occurred;

that the target group member terminal is located within the coverage of the network device;

that the target group member terminal has determined, according to an interface availability judgment rule, that a Uu interface is available;

that an access layer of the target group member terminal has reported Uu interface availability information to an upper layer;

that a resource allocation mode in which the target group member terminal works includes mode 1;

that the target group member terminal is in an RRC connected state;

that a terminal capability of the target group member terminal supports transmitting, to another terminal, a resource allocated by the network device; and that a terminal capability of the target group member terminal supports the resource allocation mode 2d.

Optionally, the terminal further includes:

a first transceiver module, configured to transmit a first release message to the group member terminal, and/or transmit the first release message to the network device, where the first release message is used to indicate resource configuration information released by the target terminal and/or resource configuration information that needs to be released by the group member terminal;

or receive a second release message from the group member terminal, where the second release message is used to indicate resource configuration information released by the group member terminal;

or receive a third release message from the network device, where the third release message is used to indicate resource configuration information, released by the network device, of the group administrator terminal, and/or resource configuration information, released by the network device, of the group member terminal.

Optionally, a transmitting condition of the first release message includes at least one of the following:

that the target terminal meets a preset release condition; and that the target terminal has received a release request message from the group member terminal.

Optionally, a transmitting condition of the first release message includes at least one of the following:

that the target terminal has moved out of a coverage of the network device;

that the target terminal has determined, according to an interface availability judgment rule, that a Uu interface is unavailable;

that an access layer of the target terminal has reported Uu interface unavailability information to an upper layer;

that the target terminal has entered an RRC idle state or RRC inactive state;

that the target terminal has initiated an RRC connection establishment procedure, but the initiated RRC connection establishment procedure failed;

that the target terminal has initiated an RRC connection recovery procedure, but the initiated RRC connection recovery procedure failed;

that the target terminal has initiated an RRC connection reestablishment procedure, but the initiated RRC connection reestablishment procedure failed;

that the target terminal has encountered an uplink radio link failure;

that the target terminal has used uplink timing in sidelink communication, but uplink asynchronization occurred;

that the target terminal has performed UL BWP switching;

that the target terminal has performed a cell selection or reselection procedure or a cell handover procedure;

that a terminal capability of the target terminal does not support transmitting, to another terminal, a resource allocated by the network device;

that a terminal capability of the target terminal does not support a resource allocation mode 2d;

that a current UL BWP of the target terminal has been deactivated;

that the target terminal is configured with CA or DC, and an SCell has been deactivated; and up to implementation of the target terminal.

Optionally, a transmitting condition of the second release message includes at least one of the following:

that channel congestion or channel interference has been detected when the group member terminal performs transmission by using related resource configuration information;

that the group member terminal has encountered a sidelink radio link failure;

that transmission of a service of the group member terminal has stopped; or up to implementation of the group member terminal.

Optionally, a transmitting condition of the third release message includes at least one of the following:

that the network device has received a release request message from the group administrator terminal;

that the network device has received a release request message from the group member terminal; and up to implementation of the network device.

Optionally, the release request message includes at least one of the following:

indication information for requesting to release the resource configuration information;

a destination ID corresponding to resource configuration information that is requested to release;

a source ID corresponding to the resource configuration information that is requested to release;

a UE ID corresponding to the resource configuration information that is requested to release; and the resource configuration information that is requested to release.

Optionally, the third release message includes at least one of the following:

indication information for agreeing to or initiating release of resource configuration information;

a destination ID corresponding to resource configuration information that needs to be released;

a source ID corresponding to resource configuration information that needs to be released;

a UE ID corresponding to resource configuration information that needs to be released; and the resource configuration information that needs to be released.

Optionally, the terminal further includes:

a processing module, configured to process resource configuration information, where the processing includes any one of the following:

suspending, suspending and resuming, and suspending and releasing.

Optionally, the processing module is specifically configured to perform any one of the following:

suspending the resource configuration information when a preset release condition is satisfied; and in a preset time, restoring the resource configuration information when the preset release condition is no longer satisfied; and suspending the resource configuration information when a release request message is received.

Optionally, the resource includes at least one of a dynamically scheduled resource, a semi-persistent scheduling resource, and a resource pool.

In this embodiment, the terminal 100 is capable of implementing the processes implemented in the method embodiment shown in FIG. 1 of this disclosure, with the same beneficial effects achieved. To avoid repetition, details are not described herein again.

Figure 11:
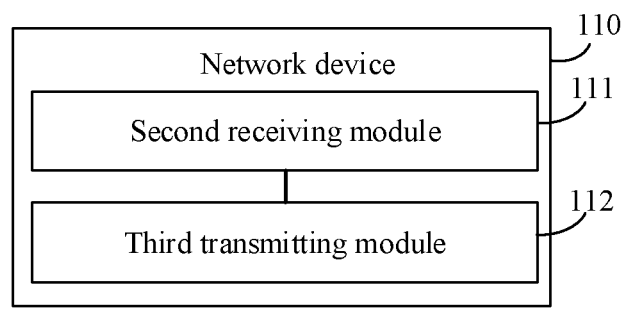
FIG. 11 is a first schematic structural diagram of a network device according to an embodiment of this disclosure.

Referring to FIG. 11, FIG. 11 is a schematic structural diagram of a network device according to an embodiment of this disclosure. As shown in FIG. 11, the network device 110 includes:

a second receiving module 111, configured to receive first request information from a target terminal, where the first request information is used to request allocation of a resource; and a third transmitting module 112, configured to transmit the information related to the resource to the target terminal.

In this embodiment of this disclosure, optionally, the target terminal is any one of the following:

a group administrator terminal, where the group administrator terminal is determined by an upper layer or access layer; and a target group member terminal, where the target group member terminal is determined by a group administrator terminal or the network device, and the group administrator terminal is determined by an upper layer.

Optionally, the information related to the resource includes at least one of the following:

one or more pieces of resource configuration information;
an identifier of a group administrator terminal corresponding to the resource configuration information;
an identifier of a group member terminal corresponding to the resource configuration information;
an identifier of a group corresponding to the resource configuration information;
one or more pieces of switching acknowledgement information;
an identifier of a group administrator terminal corresponding to the switching acknowledgement information;
an identifier of a group member terminal corresponding to the switching acknowledgement information;
an identifier of a group corresponding to the switching acknowledgement information; and
release condition information corresponding to the resource configuration information; where
the identifier includes at least one of the following: a destination ID, a source ID, or a UE ID, and the switching acknowledgement information is used to initiate or confirm switching of a resource allocation mode.

Optionally, the network device further includes:

a second receiving module, configured to receive a first release message from the target terminal, where the first release message is used to indicate resource configuration information released by the target terminal and/or resource configuration information that needs to be released by a group member terminal;

or receive a second release message from a group member terminal, where the second release message is used to indicate resource configuration information released by the group member terminal;

or transmit a third release message to the target terminal, and/or transmit a third release message to the group member terminal, where the third release message is used to indicate resource configuration information, released by the network device, of the group administrator terminal, and/or resource configuration information, released by the network device, of the group member terminal.

Optionally, a transmitting condition of the third release message includes at least one of the following:

that the network device has received a release request message from the group administrator terminal;
that the network device has received a release request message from the group member terminal; and
up to implementation of the network device.

Optionally, the release request message includes at least one of the following:

indication information for requesting to release the resource configuration information;
a destination ID corresponding to resource configuration information that is requested to release;
a source ID corresponding to the resource configuration information that is requested to release;
a UE ID corresponding to the resource configuration information that is requested to release; and
the resource configuration information that is requested to release.

Optionally, the third release message includes at least one of the following:

indication information for agreeing to or initiating release of resource configuration information;
a destination ID corresponding to resource configuration information that needs to be released;
a source ID corresponding to resource configuration information that needs to be released;
a UE ID corresponding to resource configuration information that needs to be released; and
the resource configuration information that needs to be released.

In this embodiment, the network device 110 is capable of implementing the processes implemented in the method embodiment shown in FIG. 2 of this disclosure, with the same beneficial effects achieved. To avoid repetition, details are not described herein again.

Figure 12:
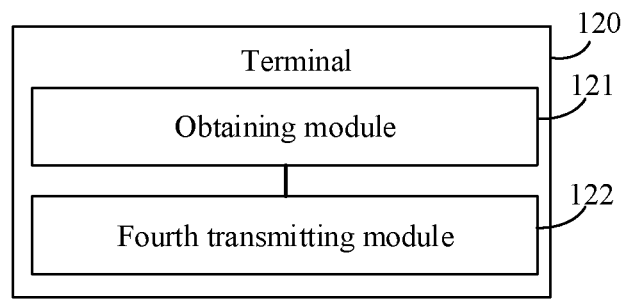
FIG. 12 is a second schematic structural diagram of a terminal according to an embodiment of this disclosure.

Referring to FIG. 12, FIG. 12 is a schematic structural diagram of a terminal according to an embodiment of this disclosure. As shown in FIG. 12, the terminal 120 includes:

an obtaining module 121, configured to obtain resource configuration information from a network device; and
a fourth transmitting module 122, configured to transmit a fourth release message to the network device; where the fourth release message is used to indicate resource configuration information released by the terminal.

Optionally, a transmitting condition of the fourth release message includes at least one of the following:

that the terminal meets a preset release condition;
that the terminal has moved out of a coverage of the network device;
that the terminal has determined, according to an interface availability judgment rule, that a Uu interface is unavailable;
that an access layer of the terminal has reported Uu interface unavailability information to an upper layer;
that the terminal enters an RRC idle state or RRC inactive state;
that the terminal has initiated an RRC connection establishment procedure, but the initiated RRC connection establishment procedure failed;
that the terminal has initiated an RRC connection recovery procedure, but the initiated RRC connection recovery procedure failed;

that the terminal has initiated an RRC connection reestablishment procedure, but the initiated RRC connection reestablishment procedure failed;

that the terminal has encountered an uplink radio link failure;

that the terminal has used uplink timing in sidelink communication, but uplink asynchronization occurred;

that the terminal has performed UL BWP switching;

that the terminal has performed a cell selection or reselection procedure or a cell handover procedure;

that a terminal capability of the terminal does not support transmitting, to another terminal, a resource allocated by the network device;

that a terminal capability of the terminal does not support a resource allocation mode 1;

that a current UL BWP of the terminal has been deactivated;

that the terminal is configured with CA or DC, and an SCell has been deactivated; and up to implementation of the terminal.

In this embodiment, the terminal 120 is capable of implementing the processes implemented in the method embodiment shown in FIG. 8 of this disclosure, with the same beneficial effects achieved. To avoid repetition, details are not described herein again.

Figure 13:
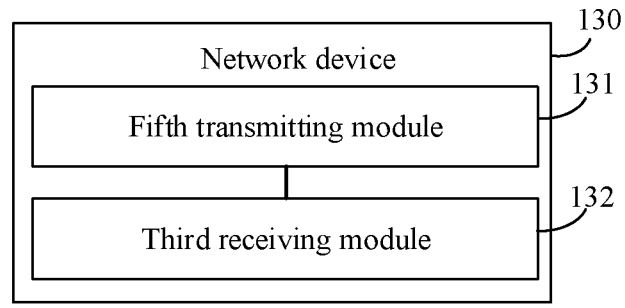
FIG. 13 is a second schematic structural diagram of a network device according to an embodiment of this disclosure.

Referring to FIG. 13, FIG. 13 is a schematic structural diagram of a network device according to an embodiment of this disclosure. As shown in FIG. 13, the network device 130 includes:

a fifth transmitting module 131, configured to transmit resource configuration information to a terminal; and a third receiving module 132, configured to receive a fourth release message from the terminal; where the fourth release message is used to indicate resource configuration information released by the terminal.

In this embodiment, the network device 130 is capable of implementing the processes implemented in the method embodiment shown in FIG. 9 of this disclosure, with the same beneficial effects achieved. To avoid repetition, details are not described herein again.

An embodiment of this disclosure further provides a terminal, including a processor, a memory, and a computer program stored in the memory and capable of running on the processor. When the computer program is executed by the processor, the processes of the foregoing embodiment of the method for resource allocation applied to the target terminal are implemented, or the processes of the foregoing embodiment of the method for resource release applied to the terminal are implemented, with the same technical effects achieved. To avoid repetition, details are not described herein again.

Figure 14:
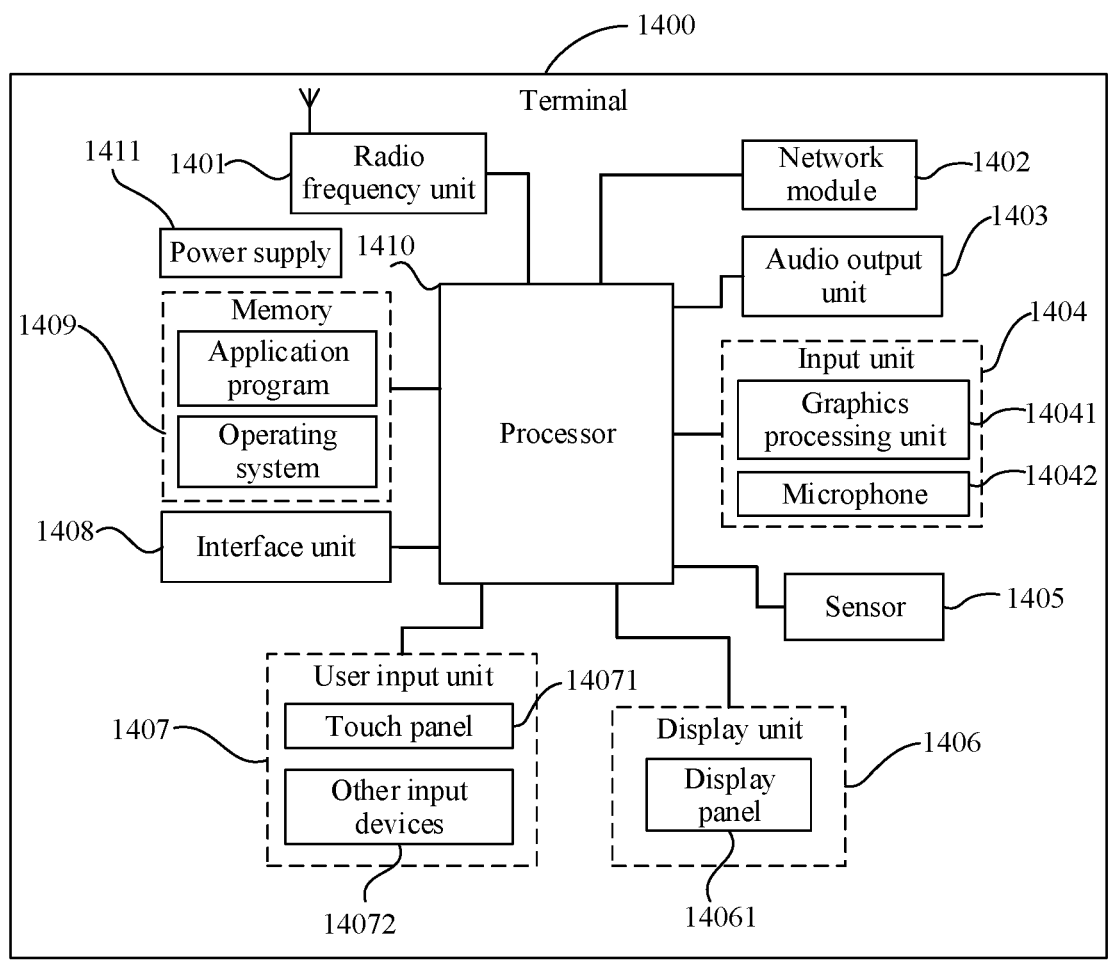
FIG. 14 is a third schematic structural diagram of a terminal according to an embodiment of this disclosure.

Specifically, FIG. 14 is a schematic structural diagram of hardware of a terminal for implementing the embodiments of this disclosure. The terminal 1400 includes but is not limited to components such as a radio frequency unit 1401, a network module 1402, an audio output unit 1403, an input unit 1404, a sensor 1405, a display unit 1406, a user input unit 1407, an interface unit 1408, a memory 1409, a processor 1410, and a power supply 1411. A person skilled in the art may understand that the structure of the terminal shown in FIG. 14 does not constitute any limitation on the terminal. The terminal may include more or fewer components than those shown in the figure, or a combination of some components, or the components disposed differently. In this embodiment of this disclosure, the terminal includes but is not limited to a mobile phone, a tablet computer, a laptop computer, a personal digital assistant, an in-vehicle terminal, a wearable device, a pedometer, and the like.

Specifically, the terminal 1400 is capable of implementing the processes of the foregoing embodiment of the method for resource allocation applied to the target terminal in FIG. 1, or the processes of the foregoing embodiment of the method for resource release applied to the terminal in FIG. 8, with the same technical effects achieved. To avoid repetition, details are not described herein again.

It should be understood that, in this embodiment of this disclosure, the radio frequency unit 1401 may be configured to: receive and transmit signals in an information receiving/transmitting process or a call process; and specifically, after receiving downlink data from a base station, transmit the downlink data to the processor 1410 for processing, and in addition, transmit uplink data to the base station. Generally, the radio frequency unit 1401 includes but is not limited to an antenna, at least one amplifier, a transceiver, a coupler, a low noise amplifier, a duplexer, and the like. In addition, the radio frequency unit 1401 may also communicate with a network and other devices via a wireless communications system.

The terminal provides a user with wireless broadband internet access through the network module 1402, for example, helping the user to transmit and receive e-mails, browse web pages, and access streaming media.

The audio output unit 1403 may convert audio data received by the radio frequency unit 1401 or the network module 1402 or stored in the memory 1409 into an audio signal and output the audio signal as a sound. Furthermore, the audio output unit 1403 may also provide audio output (for example, a call signal received sound or a message received sound) related to a specific function performed by the terminal 1400. The audio output unit 1403 includes a speaker, a buzzer, a receiver, and the like.

The input unit 1404 is configured to receive an audio or video signal. The input unit 1404 may include a graphics processing unit (GPU) 14041 and a microphone 14042. The graphics processing unit 14041 processes image data of a still picture or video obtained by an image capture apparatus (such as a camera) in a video capture mode or an image capture mode. A processed image frame may be displayed on the display unit 1406. The image frame processed by the graphics processing unit 14041 may be stored in the memory 1409 (or another storage medium) or be transmitted by the radio frequency unit 1401 or the network module 1402. The microphone 14042 is capable of receiving sounds and processing such sounds into audio data. The processed audio data may be converted in a telephone call mode into a format that can be transmitted by the radio frequency unit 1401 to a mobile communications base station, for outputting.

The terminal 1400 may further include at least one sensor 1405, for example, an optical sensor, a motion sensor, and another sensor. Specifically, the optical sensor may include an ambient light sensor and a proximity sensor. The ambient light sensor may adjust luminance of the display panel 14061 based on brightness of ambient light, and the proximity sensor may turn off the display panel 14061 and/or backlight when the terminal 1400 moves close to an ear. As a type of motion sensor, an accelerometer sensor can detect magnitudes of accelerations in all directions (usually three axes), can detect a magnitude and a direction of gravity when the mobile phone is in a static state, and can be applied to posture recognition (such as screen switching between portrait and landscape, related games, and magnetometer posture calibration) of the terminal, functions related to vibration recognition (such as pedometer and tapping), and the like. The sensor 1405 may also include a fingerprint sensor, a pressure sensor, an iris sensor, a molecular sensor, a gyroscope, a barometer, a hygrometer, a thermometer, an infrared sensor, and the like. Details are not described herein.

The display unit 1406 is configured to display information input by the user or information provided to the user. The display unit 1406 may include a display panel 14061, and the display panel 14061 may be configured in a form of a liquid crystal display (LCD), an organic light-emitting diode (DOLED), or the like.

The user input unit 1407 may be configured to receive input digit or character information and generate key signal input related to user setting and function control of the mobile terminal. Specifically, the user input unit 1407 may include a touch panel 14071 and other input devices 14072. The touch panel 14071 is also referred to as a touchscreen and can collect a touch operation (such as an operation performed by the user on the touch panel 14071 or near the touch panel 14071 with a finger or by using any proper object or accessory such as a stylus) of the user on or near the touch panel 14071. The touch panel 14071 may include two parts: a touch detection apparatus and a touch controller. The touch detection apparatus detects a touch azimuth of a user, detects a signal brought by a touch operation, and transmits the signal to the touch controller. The touch controller receives touch information from the touch detection apparatus, converts the touch information into touchpoint coordinates, and transmits the touchpoint coordinates to the processor 1410, and can receive a command transmitted by the processor 1410 and execute the command. In addition, the touch panel 14071 may be implemented in a plurality of forms, for example, as a resistive, capacitive, infrared, or surface acoustic wave touch panel. In addition to the touch panel 14071, the user input unit 1407 may further include other input devices 14072. Specifically, the other input devices 14072 may include but are not limited to a physical keyboard, a function key (such as a volume control key or an on/off key), a trackball, a mouse, and a joystick. Details are not described herein.

Further, the touch panel 14071 may cover the display panel 14061. When detecting a touch operation on or near the touch panel 14071, the touch panel 14071 transmits the touch operation to the processor 1410 to determine a type of a touch event. Then, the processor 1410 provides a corresponding visual output on the display panel 14061 based on the type of the touch event. Although in FIG. 14, the touch panel 14071 and the display panel 14061 act as two independent parts to implement input and output functions of the terminal, in some embodiments, the touch panel 14071 and the display panel 14061 may be integrated to implement the input and output functions of the terminal. This is not specifically limited herein.

The interface unit 1408 is an interface between an external apparatus and the terminal 1400. For example, the external apparatus may include a wired or wireless headphone port, an external power (or battery charger) port, a wired or wireless data port, a memory card port, a port for connecting an apparatus provided with a recognition module, an audio input/output (I/O) port, a video I/O port, an earphone port, and the like. The interface unit 1408 may be configured to: receive input (for example, data information and power) from the external apparatus, and transmit the received input to one or more elements in the terminal 1400, or may be configured to transmit data between the terminal 1400 and the external apparatus.

The memory 1409 may be configured to store software programs and various data. The memory 1409 may primarily include a program storage area and a data storage area. The program storage area may store an operating system, an application (such as an audio play function and an image play function) required by at least one function, and the like. The data storage area may store data (such as audio data and a phone book) created based on use of the mobile phone. In addition, the memory 1409 may include a high-speed random access memory, and may further include a non-volatile memory such as at least one disk storage device, a flash memory device, or another volatile solid-state storage device.

The processor 1410 is a control center of the terminal, and is connected to all components of the terminal by using various interfaces and lines. By running or executing a software program and/or module that is stored in the memory 1409 and calling data stored in the memory 1409, the processor 1410 executes various functions of the terminal and processes data, so as to perform overall monitoring on the terminal. The processor 1410 may include one or more processing units. Optionally, an application processor and a modem processor may be integrated in the processor 1410. The application processor primarily processes an operating system, user interfaces, application programs, and the like. The modem processor primarily processes radio communication. It can be understood that the modem processor may alternatively be not integrated in the processor 1410.

The terminal 1400 may further include the power supply 1411 (for example, a battery) supplying power to all components. Optionally, the power supply 1411 may be logically connected to the processor 1410 through a power management system. In this way, functions such as charge management, discharge management, and power consumption management are implemented by using the power management system.

In addition, the terminal 1400 may also include some functional modules that are not shown. Details are not described herein.

An embodiment of this disclosure further provides a network device, including a processor, a memory, and a computer program stored in the memory and capable of running on the processor. When the computer program is executed by the processor, the processes of the foregoing embodiment of the method for resource allocation applied to the network device are implemented, or the processes of the foregoing embodiment of the method for resource release applied to the network device are implemented, with the same technical effects achieved. To avoid repetition, details are not described herein again.

Figure 15:
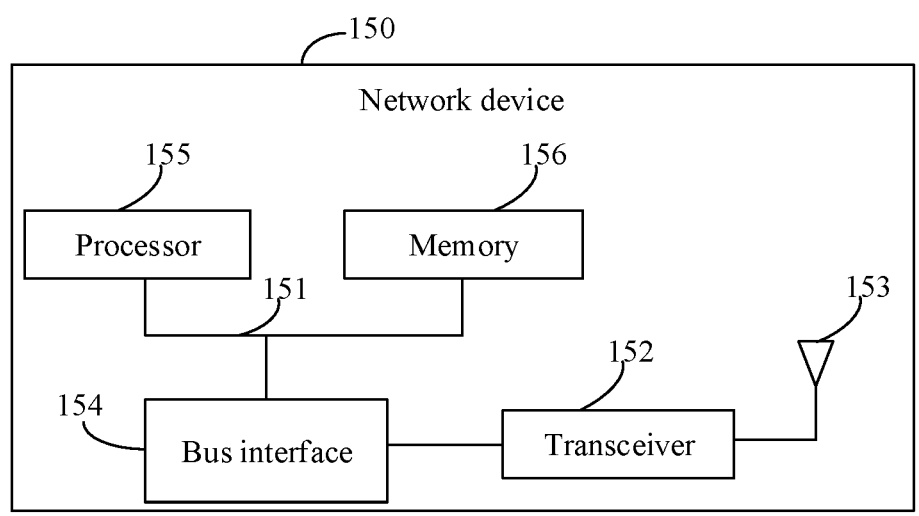
FIG. 15 is a third schematic structural diagram of a network device according to an embodiment of this disclosure.

Specifically, FIG. 15 is a schematic structural diagram of hardware of a network device for implementing the embodiments of this disclosure. The network device 150 includes a bus 151, a transceiver 152, an antenna 153, a bus interface 154, a processor 155, and a memory 156.

In this embodiment of this disclosure, the network device 150 further includes a computer program stored in the memory 156 and capable of running on the processor 155. When the computer program is executed by the processor 155, the processes of the foregoing embodiment of the method for resource allocation applied to the network device in FIG. 2 are implemented, or the processes of the foregoing embodiment of the method for resource release applied to the network device in FIG. 9 are implemented, with the same technical effects achieved. To avoid repetition, details are not described herein again.

The transceiver 152 is configured to receive and transmit data under the control of processor 155.

In FIG. 15, a bus architecture (represented by a bus 151), that is, the bus 151, may include any quantity of interconnected buses and bridges. The bus 151 connects one or more processors represented by the processor 155 to each circuit of a memory represented by a memory 156. The bus 151 may further connect a peripheral device and a voltage stabilizer to other circuits such as a power management circuit. This is known in the prior art, and the specification does not provide a further description. The bus interface 154 provides an interface between the bus 151 and the transceiver 152. The transceiver 152 may be one component or a plurality of components, for example, a plurality of transmitters and receivers, and provides units for communicating with a variety of other apparatuses on a transmission medium. Data processed by the processor 155 is transmitted over a wireless medium through the antenna 153. Further, the antenna 153 also receives data and transmits the data to the processor 155.

The processor 155 is responsible for managing the bus 151 and general processing, and provides various functions, including timing, peripheral interfaces, voltage regulation, power management, and other control functions. The memory 156 may be configured to store data that is used when the processor 155 performs an operation.

Optionally, the processor 155 may be a CPU, an ASIC, an FPGA, or a CPLD.

An embodiment of this disclosure further provides a computer-readable storage medium, where a computer program is stored in the computer-readable storage medium. When the computer program is executed by a processor, the processes of the foregoing embodiment of the method for resource allocation are implemented, or the processes of the foregoing embodiment of the method for resource release are implemented, with the same technical effects achieved. To avoid repetition, details are not described herein again. The computer-readable storage medium is, for example, a read-only memory (ROM), a random access memory (RAM), a magnetic disk, or an optical disc.

It should be noted that the terms "include", "comprise", or any of their variants are intended to cover a non-exclusive inclusion, such that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude the existence of other identical elements in the process, method, article, or apparatus that includes the element.

According to the foregoing description of the implementations, a person skilled in the art may clearly understand that the methods in the foregoing embodiments may be implemented by using software in combination with a necessary common hardware platform, and certainly may alternatively be implemented by using hardware. However, in most cases, the former is a preferred implementation. Based on such an understanding, the technical solutions of this disclosure essentially, or the part contributing to the prior art may be implemented in a form of a software product. The software product is stored in a storage medium (for example, a ROM/RAM, a magnetic disk, or an optical disc), and includes several instructions for instructing a terminal (which may be a mobile phone, a computer, a server, an air conditioner, a network device, or the like) to perform the method described in the embodiments of this disclosure.

The foregoing describes the embodiments of this disclosure with reference to the accompanying drawings. However, this disclosure is not limited to the foregoing specific implementation manners. The foregoing specific implementation manners are merely illustrative rather than restrictive. As instructed by this disclosure, persons of ordinary skill in the art may develop many other manners without departing from principles of this disclosure and the protection scope of the claims, and all such manners fall within the protection scope of this disclosure.

What is claimed is:

1. A method for resource allocation, performed by a target terminal and comprising:
   transmitting first request information to a network device, wherein the first request information is used to request allocation of a resource;
   receiving, from the network device, information related to the resource; and
   transmitting the information related to the resource to a group member terminal;
   wherein the target terminal is a group administrator terminal, and before the transmitting first request information to a network device, the method further comprises:
   transmitting switching negotiation information to related group member terminals; and
   receiving switching negotiation acceptance information from Y group member terminals of the related group member terminals; wherein
   the switching negotiation information is information used for negotiating future use of a resource that is obtained through requesting by the target terminal from the network device, the first request information is used to request a resource for the Y group member terminals, and Y is a positive integer, or
   wherein the target terminal is a target group member terminal, and before the transmitting first request information to a network device, the method further comprises:
   receiving second request information from a group administrator terminal; wherein
   the second request information is used to request the target group member terminal to perform resource scheduling.

2. The method according to claim 1, wherein
   the target terminal is the group administrator terminal, wherein the group administrator terminal is determined by an upper layer or access layer; or
   the target terminal is the target group member terminal, wherein the target group member terminal is determined by the group administrator terminal or the network device, and the group administrator terminal is determined by an upper layer or access layer.

3. The method according to claim 1, wherein:
   the first request information comprises at least one of the following:
   a group identifier;
   a total quantity of group member terminals;
   a quantity of group member terminals requiring resource allocation;
   an identifier of a group administrator terminal;
   an identifier of a group member terminal;
   an identifier of a group member terminal requiring resource allocation;

switching request information;

time information of one or more to-be-transmitted services; and quality of service QoS information of one or more to-be-transmitted services; wherein the identifier comprises at least one of: a destination identifier destination ID, a source identifier source ID, or a terminal identifier UE ID, and the switching request information is used to request to switch a resource allocation mode; and/or, the information related to the resource comprises at least one of the following:

one or more pieces of resource configuration information;

an identifier of a group administrator terminal corresponding to the resource configuration information;

an identifier of a group member terminal corresponding to the resource configuration information;

an identifier of a group corresponding to the resource configuration information;

one or more pieces of switching acknowledgement information;

an identifier of a group administrator terminal corresponding to the switching acknowledgement information;

an identifier of a group member terminal corresponding to the switching acknowledgement information;

an identifier of a group corresponding to the switching acknowledgement information; and release condition information corresponding to the resource configuration information; wherein the identifier comprises at least one of the following: a destination ID, a source ID, or a UE ID, and the switching acknowledgement information is used to initiate or confirm switching of a resource allocation mode.

4. The method according to claim 2, wherein the target terminal is the group administrator terminal, and a prerequisite for transmitting the first request information to the network device comprises at least one of the following:

that the target terminal has entered a coverage of the network device from outside the coverage of the network device;

that the target terminal has determined, according to an interface availability judgment rule, that a Uu interface is available;

that an access layer of the target terminal has reported Uu interface availability information to an upper layer;

that a resource allocation mode in which the target terminal works comprises a resource allocation mode 1;

that the target terminal is in a radio resource control RRC connected state;

that a resource allocation mode in which the target terminal works comprises a resource allocation mode 2d;

that the target terminal has performed a cell selection or reselection procedure or a cell handover procedure;

that a terminal capability of the target terminal supports transmitting, to another terminal, a resource allocated by the network device;

that a terminal capability of the target terminal supports a resource allocation mode 2d;

that the target terminal has received request messages from N group member terminals, wherein the request message is used to request the target terminal to allocate a resource to a corresponding group member terminal, and N is a positive integer;

that the target terminal has received measurement reports of M group member terminals, wherein the measurement report is used to indicate that a corresponding group member terminal has encountered channel congestion or channel interference in sidelink communication, and M is a positive integer; and that the target terminal has not perceived available or sufficient resources in a resource sensing procedure.

5. The method according to claim 1, wherein the transmitting the information related to the resource to a group member terminal comprises any one of the following:

in a case that the information related to the resource comprises X pieces of resource configuration information and a group identifier, transmitting the X pieces of resource configuration information to corresponding X group member terminals based on the group identifier;

in a case that the information related to the resource comprises X pieces of resource configuration information and a group identifier, and the target terminal knows a source ID or UE ID of each group member terminal, transmitting the X pieces of resource configuration information to corresponding X group member terminals respectively;

in a case that the information related to the resource comprises X pieces of resource configuration information, and a source ID or UE ID that corresponds to each piece of resource configuration information, transmitting each piece of resource configuration information to a corresponding group member terminal, wherein the group member terminal corresponds to the source ID or UE ID; and in a case that the information related to the resource comprises X pieces of resource configuration information, and a destination ID that corresponds to each piece of resource configuration information, transmitting each piece of resource configuration information to a corresponding group member terminal, wherein the group member terminal corresponds to a source ID or UE ID, and the source ID or UE ID corresponds to the destination ID; wherein X is a positive integer.

6. The method according to claim 1, wherein a transmitting condition of the switching negotiation acceptance information comprises at least one of the following:

that a resource allocation mode in which the group member terminal works comprises a resource allocation mode 2a and/or the resource allocation mode 2d;

that the group member terminal has not perceived available or sufficient resources in a resource sensing procedure;

that the group member terminal has encountered channel congestion or channel interference in sidelink communication;

that a terminal capability of the group member terminal supports the resource allocation mode 2d; and that the group member terminal is in an RRC idle state or RRC inactive state; and/or, wherein the switching negotiation acceptance information comprises at least one of the following:

indication information used to indicate agreeing to switch the resource allocation mode;

a destination ID;

a source ID;

a UE ID; and resource configuration information currently used by the group member terminal.

7. The method according to claim 1, wherein after the transmitting switching negotiation information to related group member terminals, the method further comprises:

receiving switching negotiation rejection information from Z group member terminals of the related group member terminals; wherein Z is a positive integer, and a transmitting condition of the switching negotiation rejection information comprises at least one of the following:

that the group member terminal works in the resource allocation mode 1;

that the group member terminal has perceived sufficient available resources in a resource sensing procedure;

that the group member terminal has not encountered channel congestion or channel interference in sidelink communication;

that a terminal capability of the group member terminal does not support the resource allocation mode 2d; and that the group member terminal is in an RRC connected state.

8. The method according to claim 1, wherein a transmitting condition of the second request information comprises at least one of the following:

that the group administrator terminal is located outside a coverage of the network device;

that the group administrator terminal has determined, according to an interface availability judgment rule, that a Uu interface is unavailable;

that an access layer of the group administrator terminal has reported Uu interface unavailability information to an upper layer;

that the group administrator terminal is in an RRC idle state or RRC inactive state;

that the group administrator terminal has initiated an RRC connection establishment procedure, but the initiated RRC connection establishment procedure failed;

that the group administrator terminal has initiated an RRC connection recovery procedure, but the initiated RRC connection recovery procedure failed;

that the group administrator terminal has initiated an RRC connection reestablishment procedure, but the initiated RRC connection reestablishment procedure failed;

that the group administrator terminal has encountered an uplink radio link failure;

that the group administrator terminal has performed switching of an uplink bandwidth part UL BWP;

that a current UL BWP of the group administrator terminal has been deactivated;

that the group administrator terminal is configured with carrier aggregation CA or dual connectivity DC, and a secondary cell Scell has been deactivated;

that the group administrator terminal has performed a cell selection or reselection procedure or a cell handover procedure;

that a terminal capability of the group administrator terminal does not support transmitting, to another terminal, a resource allocated by the network device;

that a terminal capability of the group administrator terminal does not support the resource allocation mode 2d;

that the group administrator terminal has received request messages from N group member terminals, wherein the request message is used to request the group administrator terminal to allocate a resource to a corresponding group member terminal, and N is a positive integer;

that the group administrator terminal has received measurement reports of M group member terminals, wherein the measurement report is used to indicate that a corresponding group member terminal has encountered channel congestion in sidelink communication, and M is a positive integer;

that the group administrator terminal has not perceived available or sufficient resources in a resource sensing procedure;

that the group administrator terminal has used uplink timing in sidelink communication, but uplink asynchronization occurred;

that the target group member terminal is located within the coverage of the network device;

that the target group member terminal has determined, according to an interface availability judgment rule, that a Uu interface is available;

that an access layer of the target group member terminal has reported Uu interface availability information to an upper layer;

that a resource allocation mode in which the target group member terminal works comprises mode 1;

that the target group member terminal is in an RRC connected state;

that a terminal capability of the target group member terminal supports transmitting, to another terminal, a resource allocated by the network device; and that a terminal capability of the target group member terminal supports the resource allocation mode 2d.

9. The method according to claim 1, wherein after the transmitting the information related to the resource to a group member terminal, the method further comprises:

transmitting a first release message to the group member terminal, and/or transmitting the first release message to the network device, wherein the first release message is used to indicate resource configuration information released by the target terminal and/or resource configuration information that needs to be released by the group member terminal;

or receiving a second release message from the group member terminal, wherein the second release message is used to indicate resource configuration information released by the group member terminal;

or receiving a third release message from the network device, wherein the third release message is used to indicate resource configuration information, released by the network device, of the group administrator terminal, and/or resource configuration information, released by the network device, of the group member terminal.

10. The method according to claim 9, wherein a transmitting condition of the first release message comprises at least one of the following:

that the target terminal meets a preset release condition; and that the target terminal has received a release request message from the group member terminal; or, wherein a transmitting condition of the first release message comprises at least one of the following:

that the target terminal has moved out of a coverage of the network device;

that the target terminal has determined, according to an interface availability judgment rule, that a Uu interface is unavailable;

that an access layer of the target terminal has reported Uu interface unavailability information to an upper layer;

that the target terminal has entered an RRC idle state or RRC inactive state;

that the target terminal has initiated an RRC connection establishment procedure, but the initiated RRC connection establishment procedure failed;

that the target terminal has initiated an RRC connection recovery procedure, but the initiated RRC connection recovery procedure failed;

that the target terminal has initiated an RRC connection reestablishment procedure, but the initiated RRC connection reestablishment procedure failed;

that the target terminal has encountered an uplink radio link failure;

that the target terminal has used uplink timing in sidelink communication, but uplink asynchronization occurred;

that the target terminal has performed UL BWP switching;

that the target terminal has performed a cell selection or reselection procedure or a cell handover procedure;

that a terminal capability of the target terminal does not support transmitting, to another terminal, a resource allocated by the network device;

that a terminal capability of the target terminal does not support the resource allocation mode 2d;

that a current UL BWP of the target terminal has been deactivated; and that the target terminal is configured with CA or DC, and an SCell has been deactivated.

11. The method according to claim 9, wherein a transmitting condition of the second release message comprises at least one of the following:

that channel congestion or channel interference has been detected when the group member terminal performs transmission by using related resource configuration information;

that the group member terminal has encountered a sidelink radio link failure; and that transmission of a service of the group member terminal has stopped; and/or, wherein a transmitting condition of the third release message comprises at least one of the following:

that the network device has received a release request message from the group administrator terminal; and that the network device has received a release request message from the group member terminal.

12. The method according to claim 1, wherein after the transmitting the information related to the resource to a group member terminal, the method further comprises:

processing resource configuration information; wherein the processing comprises any one of the following:

suspending, suspending and resuming, and suspending and releasing.

13. A method for resource allocation, performed by a network device and comprising:

receiving first request information from a target terminal, wherein the first request information is used to request allocation of a resource; and transmitting information related to the resource to the target-terminal terminal;

wherein the target terminal is a group administrator terminal, and the first request information is transmitted by the group administrator terminal to the network device after the group administrator terminal transmits switching negotiation information to related group member terminals and receives switching negotiation acceptance information from Y group member terminals of the related group member terminals;

the switching negotiation information is information used for negotiating future use of a resource that is obtained through requesting by the target terminal from the network device, the first request information is used to request a resource for the Y group member terminals, and Y is a positive integer, or wherein the target terminal is a target group member terminal, and the first request information is transmitted by the target group member terminal to the network device after the target group member terminal receives second request information from a group administrator terminal; wherein the second request information is used to request the target group member terminal to perform resource scheduling.

14. The method according to claim 13, wherein the target terminal is the group administrator terminal, wherein the group administrator terminal is determined by an upper layer or access layer; or the target terminal is the target group member terminal, wherein the target group member terminal is determined by the group administrator terminal or the network device, and the group administrator terminal is determined by an upper layer or access layer.

15. The method according to claim 13, wherein after the transmitting information related to the resource to the target terminal, the method further comprises:

receiving a first release message from the target terminal, wherein the first release message is used to indicate resource configuration information released by the target terminal and/or resource configuration information that needs to be released by a group member terminal; or receiving a second release message from a group member terminal, wherein the second release message is used to indicate resource configuration information released by the group member terminal; or transmitting a third release message to the target terminal, and/or transmitting a third release message to the group member terminal, wherein the third release message is used to indicate resource configuration information, released by the network device, of the group administrator terminal, and/or resource configuration information, released by the network device, of the group member terminal.

16. A terminal, comprising a memory, a processor, and a program stored in the memory and capable of running on the processor, wherein when the program is executed by the processor, steps of a method for resource allocation are implemented, wherein the method for resource allocation comprises:

transmitting first request information to a network device, wherein the first request information is used to request allocation of a resource;

receiving, from the network device, information related to the resource; and transmitting the information related to the resource to a group member-terminal terminal;

wherein the terminal is a group administrator terminal, and before the transmitting first request information to a network device, the method further comprises:

transmitting switching negotiation information to related group member terminals; and receiving switching negotiation acceptance information from Y group member terminals of the related group member terminals; wherein the switching negotiation information is information used for negotiating future use of a resource that is obtained through requesting by the terminal from the network device, the first request information is used to request a resource for the Y group member terminals, and Y is a positive integer, or wherein the terminal is a target group member terminal, and before the transmitting first request information to a network device, the method further comprises:

receiving second request information from a group administrator terminal; wherein the second request information is used to request the target group member terminal to perform resource scheduling.

17. A network device, comprising a memory, a processor, and a program stored in the memory and capable of running on the processor, wherein when the program is executed by the processor, the steps of the method for resource allocation according to claim 13 are implemented.

18. A non-transitory computer-readable storage medium, wherein a program is stored in the computer-readable storage medium, and when the program is executed by a processor, the steps of the method for resource allocation according to claim 1 are implemented.

19. The terminal according to claim 16, wherein the terminal is the group administrator terminal, wherein the group administrator terminal is determined by an upper layer or access layer; or the terminal is the target group member terminal, wherein the target group member terminal is determined by the group administrator terminal or the network device, and the group administrator terminal is determined by an upper layer or access layer.

20. The terminal according to claim 16, wherein after the transmitting the information related to the resource to a group member terminal, the method further comprises:

transmitting a first release message to the group member terminal, and/or transmitting the first release message to the network device, wherein the first release message is used to indicate resource configuration information released by the terminal and/or resource configuration information that needs to be released by the group member terminal;

or receiving a second release message from the group member terminal, wherein the second release message is used to indicate resource configuration information released by the group member terminal;

or receiving a third release message from the network device, wherein the third release message is used to indicate resource configuration information, released by the network device, of the group administrator terminal, and/or resource configuration information, released by the network device, of the group member terminal.

* * * * *